(12) United States Patent
Imamura

(10) Patent No.: US 6,349,370 B1
(45) Date of Patent: Feb. 19, 2002

(54) MULTIPLE BUS SHARED MEMORY PARALLEL PROCESSOR AND PROCESSING METHOD

(75) Inventor: Yoshihiko Imamura, Ibaraki (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/300,461

(22) Filed: Apr. 28, 1999

(30) Foreign Application Priority Data

May 1, 1998 (JP) .......................................... 10-122541

(51) Int. Cl.⁷ .............................................. G06F 13/36
(52) U.S. Cl. ...................... 711/147; 711/148; 711/149; 711/150; 710/240; 710/241; 712/245
(58) Field of Search ................................. 711/147–153; 710/240–244; 712/245–248

(56) References Cited

U.S. PATENT DOCUMENTS

| | | | |
|---|---|---|---|
| 4,843,542 A | * | 6/1989 | Dashiell et al. |
| 5,511,224 A | * | 4/1996 | Tran et al. .................. 710/128 |
| 5,845,329 A | * | 12/1998 | Onishi et al. ................ 711/157 |
| 6,078,983 A | * | 6/2000 | Hanawa et al. ............. 710/240 |

\* cited by examiner

Primary Examiner—Than Nguyen
(74) Attorney, Agent, or Firm—Rader, Fishman & Grauer PLLC; Ronald P. Kananen

(57) ABSTRACT

A parallel processor having a high processing performance, where, before the end of a page transfer with an outside memory via an external access bus by a first access request accompanied with a page fault from one processor element to a shared memory, a second access request is generated having a page fault from another processor element to the shared memory, the sub-page requested by the first and second access requests is transferred from the outside memory to the shared memory first, and other sub-pages in the page to which the requested sub-page belongs are transferred from the outside memory to the shared memory.

26 Claims, 16 Drawing Sheets

FIG. 15

| V | N | S | P | MEANINGS OF INFORMATION BIT |
|---|---|---|---|---|
| 0 | × | × | × | NO ENTRY |
| 1 | 1 | 0 | 0 | UNPROCESSED NEW ENTRY |
| 1 | 1 | 0 | 1 | NEW ENTRY BEING EXCHANGED WITH EXTERNAL MEMORY BY USING G-BUS |
| 1 | 0 | 0 | 1 | NEW ENTRY BEING EXCHANGED WITH PE BY USING C-BUS |
| 1 | 1 | 1 | 0 | NEW ENTRY SAVED DURING EXCHANGE WITH EXTERNAL MEMORY USING G-BUS |

V ← VALIDITY BIT
N ← NEW ENTRY IDENTIFYING BIT
S ← SAVE BIT
P ← PROCESSING BIT

MULTIPLE BUS SHARED MEMORY PARALLEL PROCESSOR AND PROCESSING METHOD

BACKGROUND OF THE INVENTION

1. Field of the Invention

The present invention relates to a parallel processor comprising a plurality of processor elements and a shared memory connected via a common bus and to a processing method thereof.

2. Description of the Related Art

In recent years, parallel processors have been developed which execute in parallel a plurality of simultaneously executable instructions in a program by a plurality of processor elements (PE) built into a single chip so as to shorten the execution time for the program.

A variety of architectures are being proposed for such parallel processors. Among them, there is one in which a plurality of processor elements and a shared memory are connected to a set of common buses.

FIG. 16 is a view of the system configuration of a general parallel processor 1 of the related art.

As shown in FIG. 16, the parallel processor 1 has built into one chip a common bus 2, n number of processor elements $3_1$ to $3_n$, a shared memory 4, and a bus unit 5. The common bus 2 has connected to it the processor elements $3_1$ to $3_n$, the shared memory 4, and the bus unit 5. The bus unit 5 is connected to a main memory 7 via an external chip interface 6. One data port I/O is provided in a memory cell region 4a of the shared memory 4.

In the parallel processor 1, data is transferred via the common bus 2 and the data port I/O when the processor elements $3_1$ to $3_n$ access the data stored in the shared memory 4.

Summarizing the problem to be solved by the invention, in the above parallel processor 1, the data transfer between the processor elements $3_1$ to $3_n$ and the shared memory 4 and the data transfer between the shared memory 4 and the main memory 7 are both carried out via the common bus 2. Furthermore, since the memory cell region 4a of the shared memory 4 has only one data port I/O, there Is the disadvantage that the waiting time of the processor elements $3_1$ to $3_n$ may frequently become long for the following reasons.

Namely, when a page fault occurs in the shared memory 4 and the pages are being exchanged between the shared memory 4 and the main memory 7, the processor elements $3_1$ to $3_n$ cannot access the shared memory 4 because the common bus 2 is in use. Accordingly, an access request from the processor elements $3_1$ to $3_n$ to the shared memory 4 ends up being kept waiting until the completion of the page exchange processing and the processing performance of the parallel processor 1 becomes low.

SUMMARY OF THE INVENTION

An object of the present invention is to provide a parallel processor which can realize a high processing performance and method of the same.

According to a first aspect of the present invention, there is provided a parallel processor comprising: a plurality of processor elements each having an inner memory storing one or more sub-pages and performing signal processing for the data stored in the inner memory; a first bus connected to the plurality of processor elements; a second bus connected to an outer memory; and a shared memory connected to the first bus and the second bus, the shared memory comprising: a storage means for storing a plurality of sub-pages and a control means for controlling, in accordance with an access request from the processor element, a transfer of a sub-page between the inner memory of the processor element and the storage means via the first bus and a transfer of a page comprising a plurality of sub-pages between the storage means and the outside memory via the second bus, the control means transferring sub-pages by a first access request which is a request accompanied with a page fault from one processor element to the storage means and a second access request which is a request accompanied with a page fault from another processor element to the storage means from the outside memory to the storage means, and transferring another sub-page of the pages to which the sub-pages by the first access request and the second access request belong from the outside memory to the storage means, when, before the end of a page transfer between the shared memory and outside memory through the second bus due to the first access request, the second access request is generated.

Preferably, the control means transfers sub-pages requested by the first access request and the second access request through the second bus from the outside memory to the storage means, and transfers another sub-page of the page to which the sub-page requested by the first access request belongs through the second bus from the outside memory to the storage means, then transfers another sub-page of the page to which the sub-page requested by the second access request belongs through the second bus from the outside memory to the storage means.

Preferably, the control means transfers the sub-page requested by the first access request through the second bus from the outside memory to the storage means, and transfers the sub-page through the first bus from the storage means to the processor element generating the first access request.

Preferably, the control means transfers the sub-page requested by the second access request through the second bus from the outside memory to the storage means, and transfers the sub-page through the first bus from the storage means to the processor element generating the second access request.

Preferably, the transfer of the sub-page through the first bus and the transfer of the sub-page through the second bus are performed in parallel.

Preferably, the control means is provided with an access request storage unit for storing the first access request and the second access request, a save procedure storage unit for storing a procedure indicating processing for transferring another sub-page of the pages to which the sub-pages by the first access request and the second access request belong from the outside memory to the storage means, and a control unit for storing in the save procedure storage unit a first procedure for transferring another sub-page of the page to which the sub-page by the first access request belongs through the second bus from the outside memory to the storage means, storing in the save procedure storage unit a second procedure for transferring another sub-page of the page to which the sub-page by the second access request belongs through the second bus from the outside memory to the storage means, calling up and executing the first procedure from the save procedure storage unit, and calling up and executing the second procedure from the save procedure storage unit after execution of the first procedure.

Preferably, the control means is provided with an access request storage unit for storing the first access request and the second access request in correspondence with save data and a control unit for transferring the sub-page by the first access request through the second bus from the outside memory to the storage means; setting the save data corresponding to the first access request stored in the access request storage unit in a save state, transferring the sub-page requested by the second access request through the second bus from the outside memory to the storage means, setting the save data corresponding to the second access request stored in the access request storage unit in the save state, using the save data to read the first access request stored in the access request storage unit, transferring another sub-page of the page to which the sub-page requested by the first access request belongs through the second bus from the outside memory to the storage means, using the save data after the transfer to read the second access request stored in the access request storage unit, and transferring another sub-page of the page to which the sub-page by the second access request belongs through the second bus from the outside memory to the storage means.

Preferably, the storage means is provided with a plurality of sub-banks each storing one sub-page and the shared memory further comprises a plurality of selecting means provided corresponding to each of the plurality of sub-banks and connects a corresponding sub-bank and one of the selected first bus and second bus.

Preferably, the data transfer rate of the first bus is the same as the data transfer rate of the second bus or slower than the data transfer rate of the second bus.

Preferably, each sub-bank of the storage region of the storage means is provided with a single data port.

Preferably, the plurality of sub-banks of the storage means have the same storage capacities.

Preferably, the number of the sub-banks of the storage means is the same as the number of sub-pages making up a page.

Preferably, the plurality of sub-pages making up a page have continuous addresses in the address space of the outside memory.

According to a second aspect of the present invention, there is provided a processing method of a parallel processor having a plurality of processor elements comprising the steps of: controlling, in accordance with an access request from a processor element, a transfer of a sub-page between said processor element and a shared memory via a first bus and a transfer of a page comprising a plurality of sub-pages between the shared memory and an outside memory via a second bus, transferring sub-pages by a first access request which is a request accompanied with a page fault from one processor element processors to the shared memory and a second access request which is a request accompanied with a page fault from another processor element to the shared memory from the outside memory to the shared memory, and transferring another sub-page of the pages to which the sub-pages by the first access and the second access belong from the outside memory to the shared memory, when, before the end of a page transfer between the shared memory and outside memory through the second bus due to the first access request, the second access request is generated.

According to a third aspect of the present invention, there is provided a parallel processor comprising: a plurality of processor elements each having an inner memory storing one or more sub-pages and performing processing using the data stored in the inner memory; a first bus connected to the plurality of processor elements; a second bus connected to an outer memory; and a shared memory connected to the first bus and the second bus, wherein the shared memory comprises: a storage means for storing a plurality of sub-pages and a controlling means for controlling, in accordance with an access request from the processor element, a transfer of a sub-page between the inner memory of a processor element and the storage means via the first bus and a transfer of a page comprising a plurality of sub-pages between the storage means and the outside memory via the second bus, transferring a sub-page by an access request to the storage means when there is the access request accompanied with a page fault from one processor element to the storage means, and transferring another sub-page of the page to which the sub-page requested by the access request belongs from the outside memory to the storage means.

According to a fourth aspect of the present invention, there is provided a processing method of a parallel processor having a plurality of processor elements comprising the steps of: controlling, in accordance with an access request from the processor element, a transfer of a sub-page between the processor element and a shared memory via a first bus and a transfer of a page comprising a plurality of sub-pages between the shared memory and an outside memory via a second bus, when an access request accompanied with a page fault is generated, from one processor element to the shared memory among the plurality of processor elements, transferring a sub-page requested by the access request from the outer memory to the shared memory, and transferring another sub-page of the page to which the sub-page by the access request belongs from the outer memory to the shared memory.

BRIEF DESCRIPTION OF THE DRAWINGS

These and other objects and features of the present invention will become clearer from the following description of the preferred embodiments given with reference to the accompanying drawings, in which:

FIG. 15 is a view for explaining the meaning indicated by information bits of each of the entries shown in FIG. 14.

DESCRIPTION OF THE PREFERRED EMBODIMENTS

Below, preferred embodiments will be described with reference to the accompanying drawings.

First Embodiment

Figure 1:
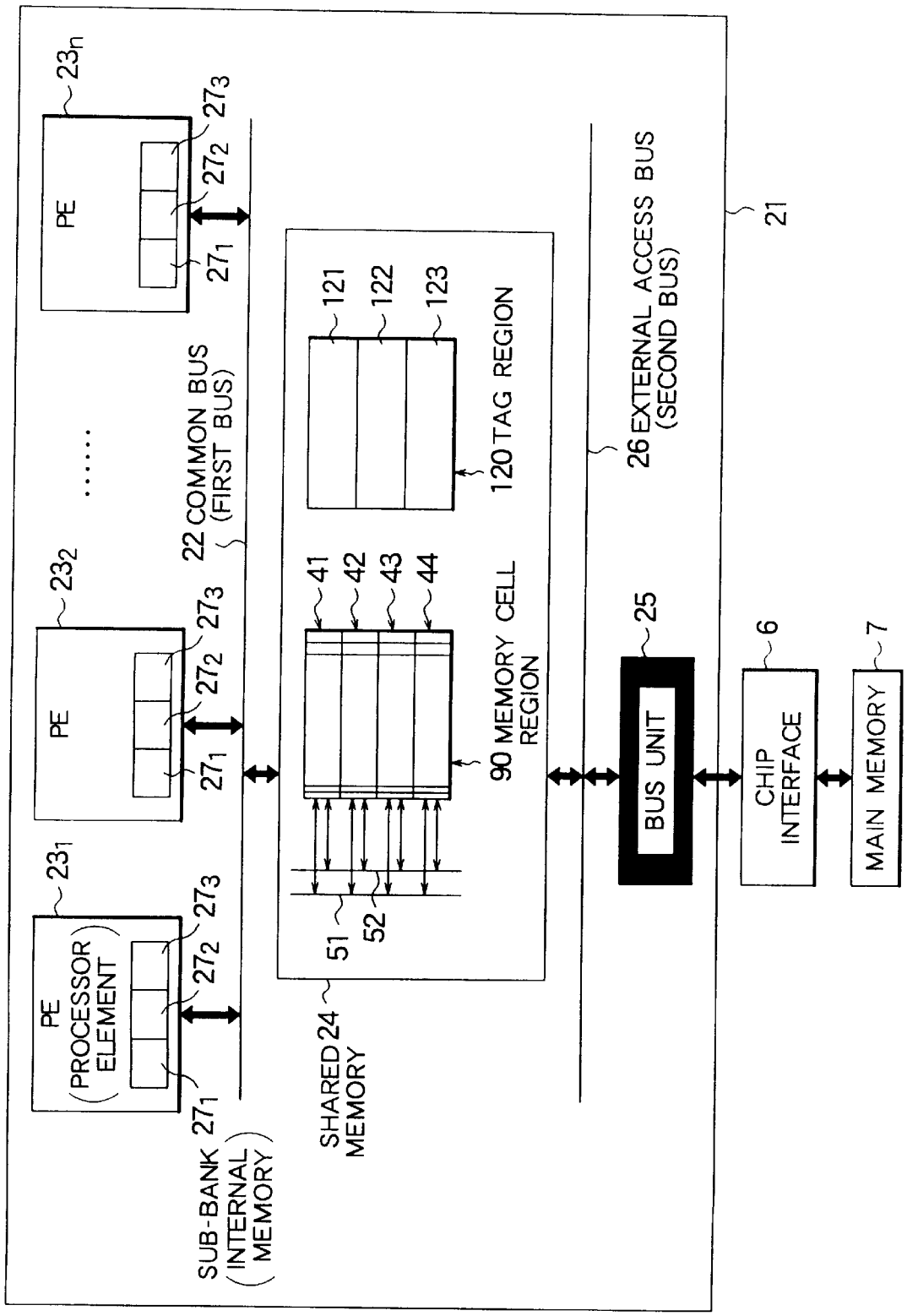
FIG. 1 is a view of the system configuration of the parallel processor according to a first embodiment of the present invention.

FIG. 1 is a view of the system configuration of a parallel processor 21 of the present embodiment.

As shown in FIG. 1 the parallel processor 21 comprises, for example, a common bus 22 as a first bus, processor elements $23_1$ to $23_n$ a shared memory 24, a bus unit 25, and an external access bus 26 as a second bus.

In the parallel processor 21, the processor elements $23_1$ to $23_n$ and the shared memory 24 are connected to the common bus 22. Also, the shared memory 24 and the bus unit 25 are connected to the external access bus 26.

The common bus 22 has a bus width of 128 bits, while the external access bus 26 has a bus width of 32 bits. The common bus 22 has a data transfer rate of more than four times that of the external access bus 26.

Note that it is possible to make the bus widths of the common bus 22 and the external access bus 26 equal.

When the parallel processor 1 is, for example, a multiple instruction multiple data (MIMD) type parallel processor, each of the processor elements $23_1$ to $23_n$ has a program counter and carries out the processing independently from the others in response to instructions stored at addresses of an instruction memory, not illustrated, indicated by the program counter. As the processor elements $23_1$ to $23_n$, for example, reduced instruction set computer (RISC) type general-purpose processors may be used.

The processor elements $23_1$ to $23_n$ are provided with sub-banks $27_1$, $27_2$, and $27_3$ as internal memories which can store a plurality of sub-pages, for example, three sub-pages. Here, a sub-page is 521 bytes of data stored in storage regions of continuous addresses on a main memory 7, and one page is composed by sub-pages of four continuous addresses.

Note that the numbers of sub-banks provided to the processor elements $23_1$ to $23_n$ can be set different from each other.

The processor elements $23_1$ to $23_n$, as explained later, read the sub-pages from the shared memory 24 and store the same in the sub-banks $27_1$ to $27_3$, but it is possible to store sub-pages of different pages among the processor elements $23_1$ to $23_n$ and among the sub-banks $27_1$ to $27_3$.

The bus unit 25 is connected to the main memory 7 via a chip interface 6 provided outside the parallel processor 21.

The main memory 7 has a memory space having 4 Gbytes of continuous addresses.

Figure 2:
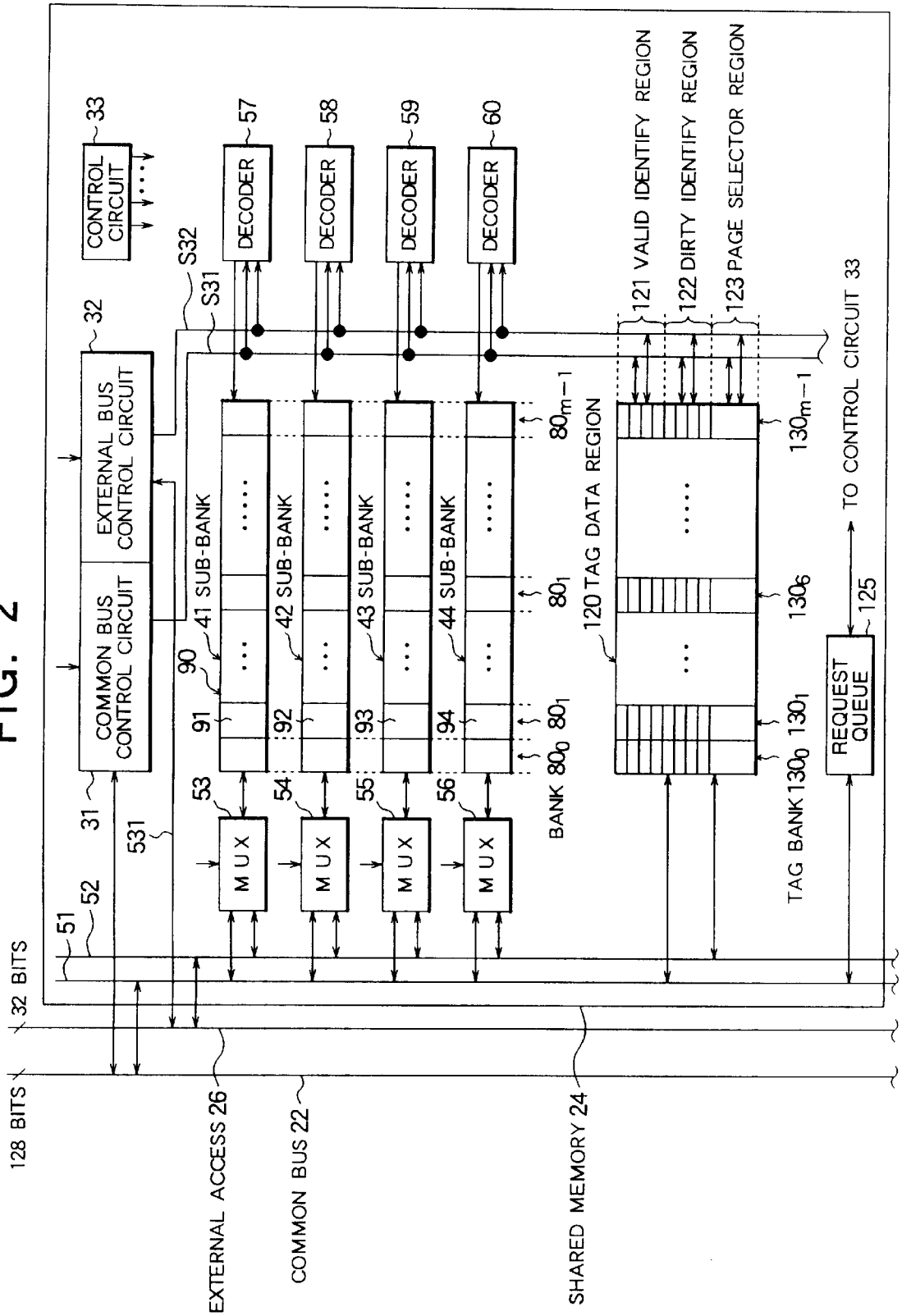
FIG. 2 is a view of the configuration of the shared memory shown in FIG. 1.

FIG. 2 is a view of the configuration of the shared memory 24 shown in FIG. 1.

As shown in FIG. 2, the shared memory 24 comprises, for example, a common bus control circuit 31, an external bus control circuit 32, a control circuit 33, memory internal buses 51 and 52, multiplexers (MUX) 53, 54, 55, and 56, a memory cell region 90, address decoders 57, 58, 59, and 60, a tag data region 120, and a request queue 125.

The control circuit 33 controls the common bus control circuit 31, the external bus control circuit 32, the multiplexers 53 to 56, and the address decoders 57 to 60.

Also, when a sub-page exchange request signal (access request) is input from the processor elements $23_1$ to $23_n$, the control circuit 33 judges whether or not the requested sub-page is stored in the memory cell region 90 (whether a page hit exists or not) by referring to tag data as characteristic data stored in the tag data region 120. When the control circuit judges that a page fault has occurred, the control circuit determines the page to be covered by the replacement with the page to be exchanged from the main memory 7 among a plurality of pages stored in the main memory cell region 90 by a method explained later with reference to FIG. 3.

Also, the control circuit 33 controls the page transfer between the shared memory 24 and the main memory 7 so as to transfer the sub-pages requested by the processor elements $23_1$ to $23_n$ first from the main memory 7 to the shared memory 24.

The common bus control circuit 31 controls the transfer of the sub-pages between the processor elements $23_1$ to $23_n$ and the memory sub-banks 41 to 44 via the memory internal bus 51 and the common bus 22. Specifically, the common bus control circuit 31 controls the address decoders 57 to 60 by outputting a control signal S31 and controls the address decoder 57 to 60 and the switching of the multiplexers 53 to 56 based on a control signal from the control circuit 33.

The external bus control circuit 32 controls the page transfer between the memory sub-banks 41 to 44 and the main memory 7 via the memory internal bus 52 and the external access bus 26. Specifically, the external bus control circuit 32 outputs a control signal S32 to control the address decoders 57 to 60 and controls the switching of the multiplexers 53 to 56 based on the control signal from the control circuit 33.

The multiplexers 53 to 56 connect the respective memory sub-banks 41 to 44 to one of the memory internal bus 51 or 52 based on the control signals S31 and S32 and a control signal from the control circuit 33.

The address decoders 57 to 60 decode the control signals S31 and S32 to control the access to the memory sub-banks 41 to 44.

The memory cell region 90 is physically and equally divided into four memory sub-banks 41 to 44. Each of the memory sub-banks 41 to 44 is provided with a single data port.

Also, the memory cell region 90 is divided by m number of banks $80_0$ to $80_{m-1}$ in order to equally straddle the memory sub-banks 41 to 44.

Each of the memory sub-banks 41 to 44 has a memory capacity able to store, for example, m number of sub-pages. Note that the sub-pages include image data.

The memory sub-banks 41 to 44 exchange data in sub-page units among the processor elements $23_1$ to $23_n$ via the multiplexers 53 to 56, the memory internal bus 51, and the common bus 22. Here, the "exchanging of data" includes a data write operation from the processor elements $23_1$ to $23_n$ to the memory sub-banks 41 to 44, a data read operation from the processor elements $23_1$ to $23_n$ to the memory sub-banks 41 to 44, and both of the operations.

Since the common bus 22 has a 128-bit bus width, a minimum of 32 (=512×8/128) bus transactions are required to transfer a 512-byte sub-page in a bus operation via the common bus 22 in which one data transfer is carried out in sub-page units.

Also, the memory sub-banks 41 to 44 exchange data with the main memory 7 in page units stored in the banks $80_0$ to $80_{m-1}$ via the multiplexers 53 to 56, the memory internal bus 52, and the external access bus 26. Here, one page is 2 Kbytes and is composed by 4 sub-pages.

Accordingly, when the head address of the sub-pages which the processor elements $23_1$ to $23_n$ are trying to access is the address A, address (A+512), address (A+1024), or address (A+1536), one page's worth of data stored in 2 Kbytes of continuous addresses from the address A in the main memory 7 is transferred to the shared memory 4, then the one page's worth of data is divided into four sub-pages and is stored in the banks $80_0$ to $80_m$.

In the present embodiment, a 4 Gbyte memory space of the main memory 7 is indicated by a 32-bit address. Here, the 31st to 11th bits of the 32-bit address indicate the head address of the page and the 10th to 0th bits indicate the address within the page. Also, the 10th and 9th bits indicate a sub-bank.

It is preferable that the amount of the data of the sub-pages stored in the memory sub-banks 41 to 44 be standardized in the system as a whole so that the sub-pages can be used in common by all of the processor elements $23_1$ to $23_n$. In the present embodiment, the memory capacity of the sub-bank $27_1$ of the processor elements $23_1$ to $23_n$ is set to 512 bytes and the amount of data of a sub-page is also set to 512 bytes.

Here, since the external access bus 26 has a bus width of 32 bits, a minimum of 512 (=2048×8/32) bus transactions are required to transfer a 2 Kbyte page in one bus operation via the external access bus 26 in which a page is the unit of one data transfer.

The tag data region 120 stores, as shown in FIG. 2, tag data as the characteristic data of a sub-page stored in the memory cell region 90 composed by the memory sub-banks 41 to 44.

The tag data region 120 has tag banks $130_0$ to $130_{m-1}$ which correspond to the banks $80_0$ to $80_{m-1}$. Data indicating the characteristics of the sub-pages stored in the respective banks $80_0$ to $80_m$ are stored in the tag banks $130_0$ to $130_{m-1}$.

The tag data is comprised of a valid identification region 121, a dirty identification region 122, and a page selector region 123.

The valid identification region 121 is provided with one valid bit indicating the validity of the data of a sub-page for each of the sub-pages. For example, "1" indicating "valid" is set for the validity bit corresponding to a valid sub-page in the valid identification region 121, while "0" indicating "invalid" is set for the validity bit corresponding to an invalid sub-page.

The dirty identification region 122 is provided with one dirty bit indicating whether data of a sub-page is dirty or not for each sub-page. Here, "dirty" means that there was a write operation from the processor elements $23_1$ to $23_n$ to the sub-page in question. When releasing the storage region storing the sub-page, the sub-page has to be written back in the main memory, 7. Namely, a write back operation is necessary.

For example, "1" indicating "valid" is set for a dirty bit corresponding to a dirty sub-page in the dirty identification region 122, while "0" indicating "invalid" is set for a dirty bit corresponding to a not-dirty sub-page.

The page selector region 123 has a page selector indicating an identification number of a page (for example, the head address of a page) stored in the banks $80_0$ to $80_m$.

When a plurality of access requests from the processor elements $23_1$ to $23_n$ to the shared memory 4 input via the common bus 22 and the memory internal bus 51 compete, the request queue 125 stores the access requests in a queue and outputs the same to the control circuit 33.

Below, an operation of the parallel processor 21 will be explained.

Figure 4:
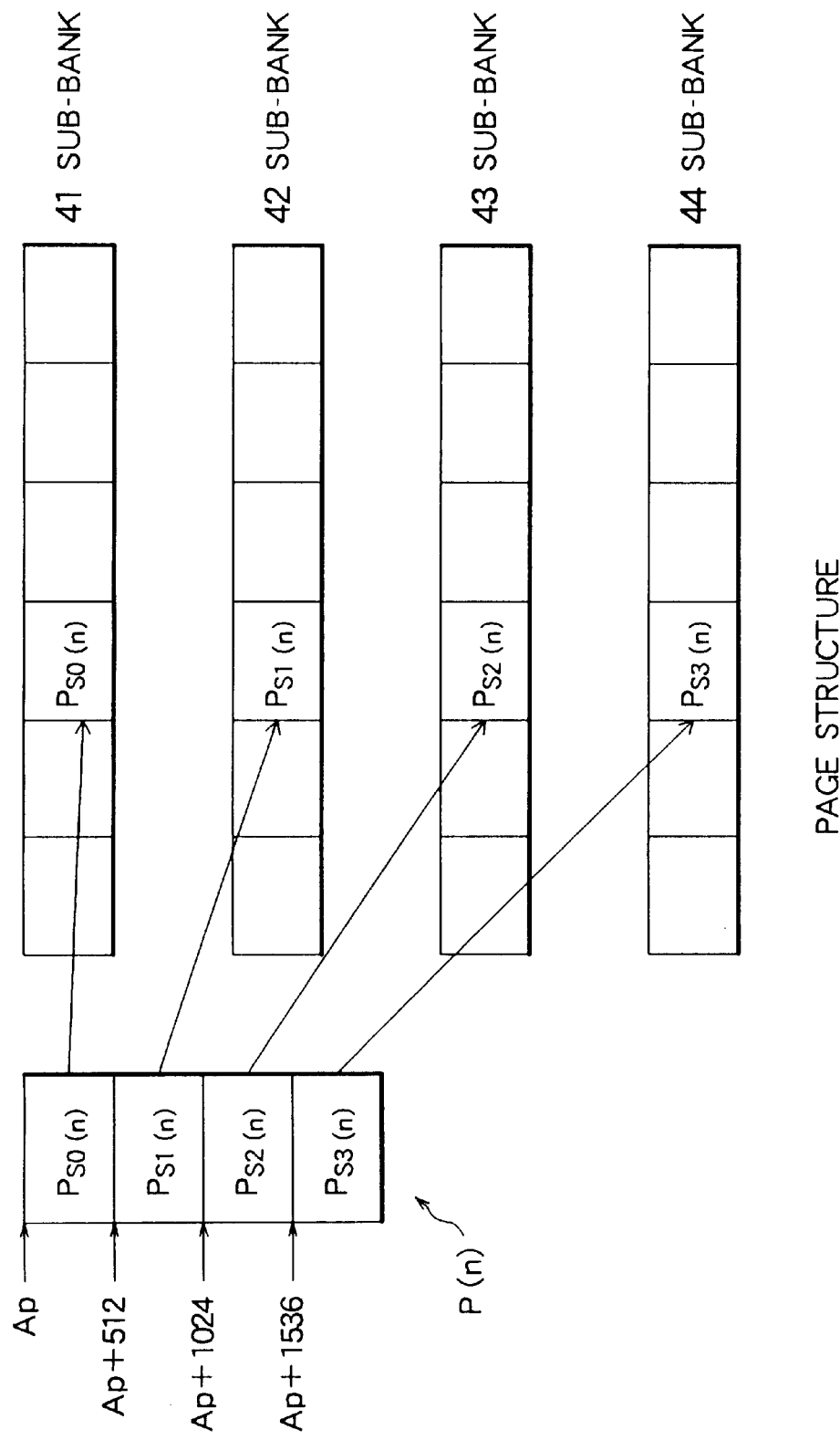
FIG. 4 is a view for explaining the correspondence of the sub-page and the sub-bank of the shared memory shown in FIG. 3.

Here, as shown in FIG. 4, when assuming n as any integer, four sub-pages which compose a page P(n) are respectively stored in the sub-banks 41, 42, 43, and 44 as Ps0(n), Ps1(n), Ps2(n), and Ps3(n).

Figure 3:
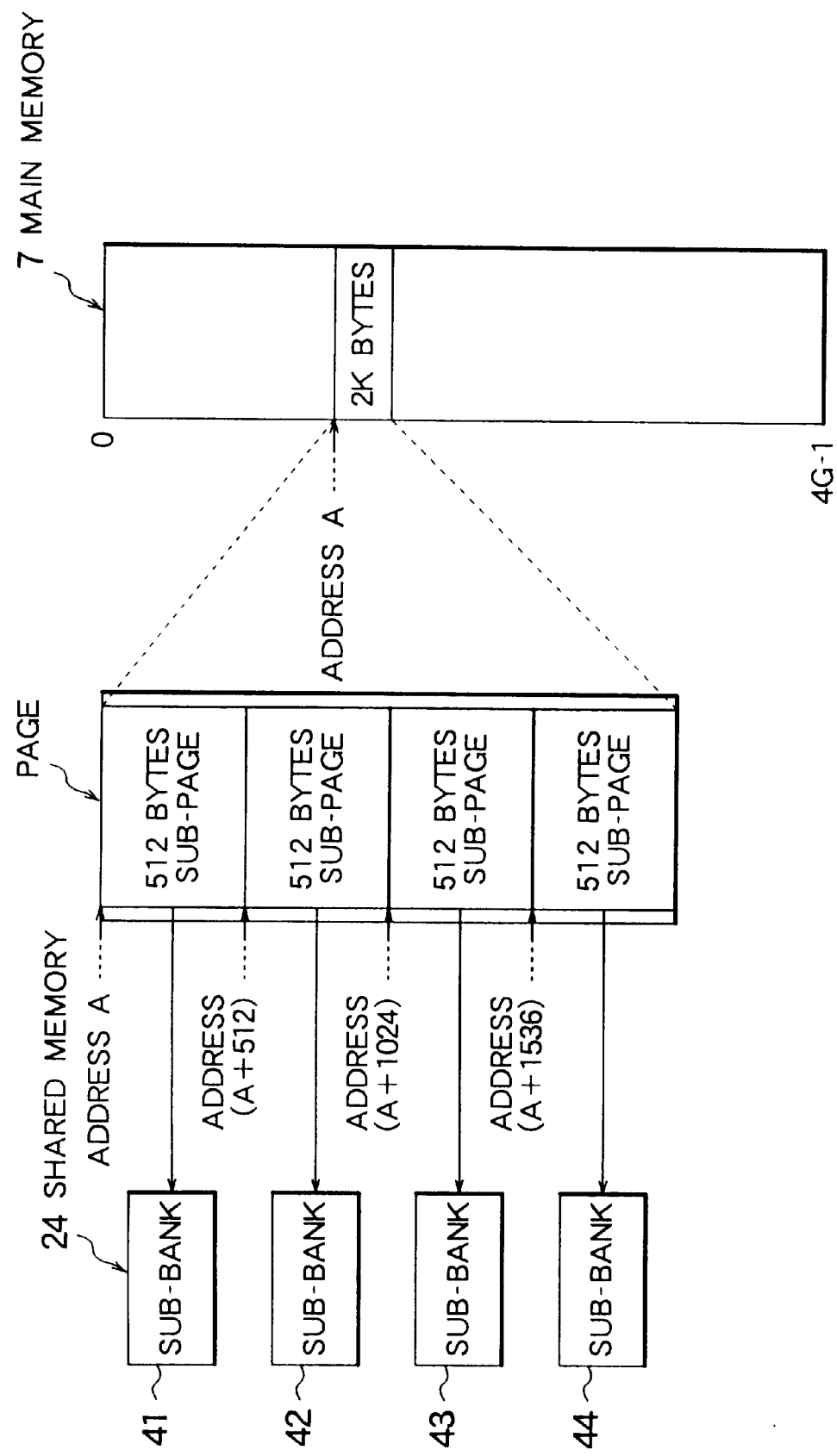
FIG. 3 is a view for explaining a sub-page to be stored in the memory sub-bank shown in FIG. 2.

For example, when the control circuit 33 shown in FIG. 2 receives as input a signal requesting to exchange a sub-page from the processor elements $23_1$ shown in FIG. 1, if the requested sub-page Ps1(1) shown in FIG. 3 is not stored in the memory cell region 90 from the tag data stored in the tag data region 120, it is judged to be a page miss. Then, the page P(1) including the requested sub-page Ps1(1) is exchanged with the page already stored in the shared memory 24 between the shared memory 24 and the main memory 7 shown in FIG. 1 via the external access bus 26. At this time, the sub-page Ps1(1) requested from the processor element $23_1$ is exchanged first among the four sub-pages Ps0(1), Ps1(1), Ps2(1), and Ps3(1) composing the page P(1).

Then, the requested sub-page Ps1(1) is output from the shared memory 24 to the processor element $23_1$ via the common bus 22.

At this time, from immediately after the sub-page exchange Ps1(1), the sub-pages Ps2(1), Ps3(1), and Ps0(1) are successively exchanged between the main memory 7 and the shared memory 24 in parallel with the sub-page exchange Ps1(1) between the shared memory 24 and the processor element $23_1$.

Note that the process of transferring the sub-page requested by the processor element PE via the common bus 22 finally to the processor element PE is called a "foreground job", while the processing of transferring the remaining three sub-pages from the main memory 7 to the shared memory 24 via the external access bus 26 is called a "background job".

Below, before completing the exchange of the page P(1) between the shared memory 24 and the main memory 7 in accordance with the exchange request from the processor element $23_1$ shown in FIG. 1, an operation of the parallel processor 21 of, for example, the case where a signal for requesting the exchange of sub-page Ps2(2) being a page miss is generated from the processor element $23_2$ shown in FIG. 1 will be explained with reference to FIG. 5.

Specifically, a case where a request for exchanging the sub-page Ps1(1) is generated from the processor element $23_1$ shown in FIG. 1 as explained above at a timing of "r1" shown in FIG. 5, then a request for exchanging the sub-page Ps2(2) is generated from the processor element $23_2$ shown in FIG. 1 at a timing of "r2" will be considered first.

In this case, the exchange of sub-page Ps1(1) from the main memory 7 to the shared memory 24 is completed at a timing of "r3", then the sub-page Ps1(1) is transferred from the shared memory 24 to the processor element $23_1$ via the common bus 22.

After completing the exchange of sub-page Ps1(1) from the main memory 7 to the shared memory 24, the sub-pages Ps2(1), Ps3(1), and Ps0(1) are successively transferred from the main memory 7 to the shared memory 24 via the external access bus 26.

After completing the exchange of sub-page Ps0(1), the sub-page Ps2(2) is subsequently exchanged from the main memory 7 to the shared memory 24 via the external access bus 26. From the timing "r4" of the completion of the exchange, the sub-page Ps2(2) is transferred to the processor element $23_2$ via the common bus 22.

After completing the exchange of sub-page Ps2(2) from the main memory 7 to the shared memory 24, the sub-pages Ps2(2), Ps3(2), and Ps0(2) are subsequently exchanged from the main memory 7 to the shared memory 24 via the external access bus 26.

According to the parallel processor 21, as explained above, after transferring one page including the Ps1(1) in response to the request for exchanging the sub-page Ps1(1) from the main memory 7 to the shared memory 24, one page including the sub-page Ps2(2) is transferred in response to the request generated next for exchanging the sub-page Ps2(2) from the main memory 7 to the shared memory 24.

Figure 5:
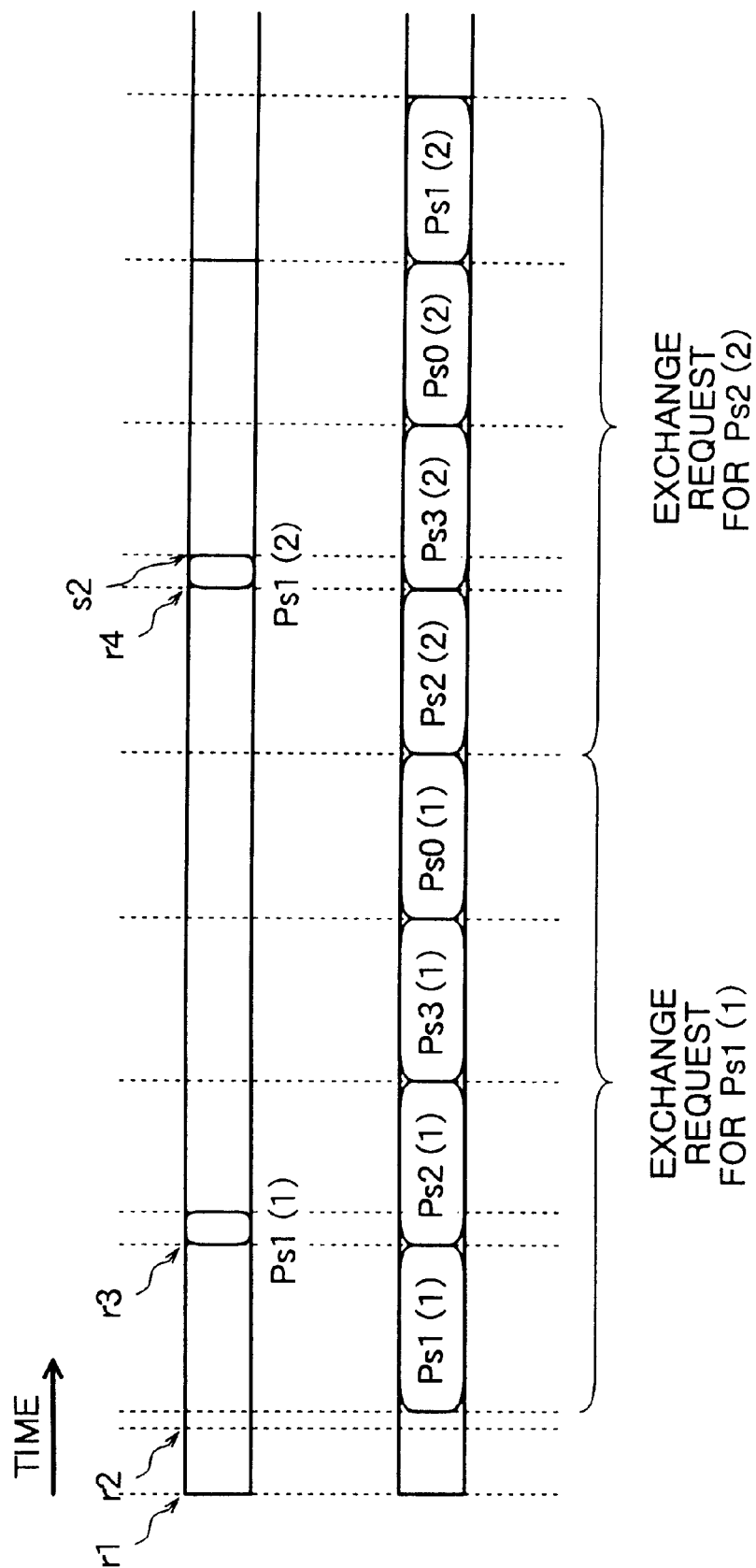
FIG. 5 is a timing chart for explaining an operation of the parallel processor shown in FIG. 1.

Therefore, 512 cycles are required from the timing "r3", which is the end of the transfer of the sub-page Ps1(1) shown in FIG. 5 from the main memory 7 to the shared memory 24, to the timing "r4", which is the end of the transfer of the sub-page Ps2(2) from the main memory 7 to the shared memory 24.

Second Embodiment

The present embodiment relates to a modification of the parallel processor of the above first embodiment. Before the completion of a page exchange between the shared memory and the main memory in response to the request for exchanging the first sub-page from one processor element, when a request for exchanging the second sub-page to a sub-page having a page miss is generated from another processor element, a parallel processor which can supply a sub-page indicated by a request for exchanging the second sub-page to the processor element at a further rapid timing will be explained.

Figure 6:
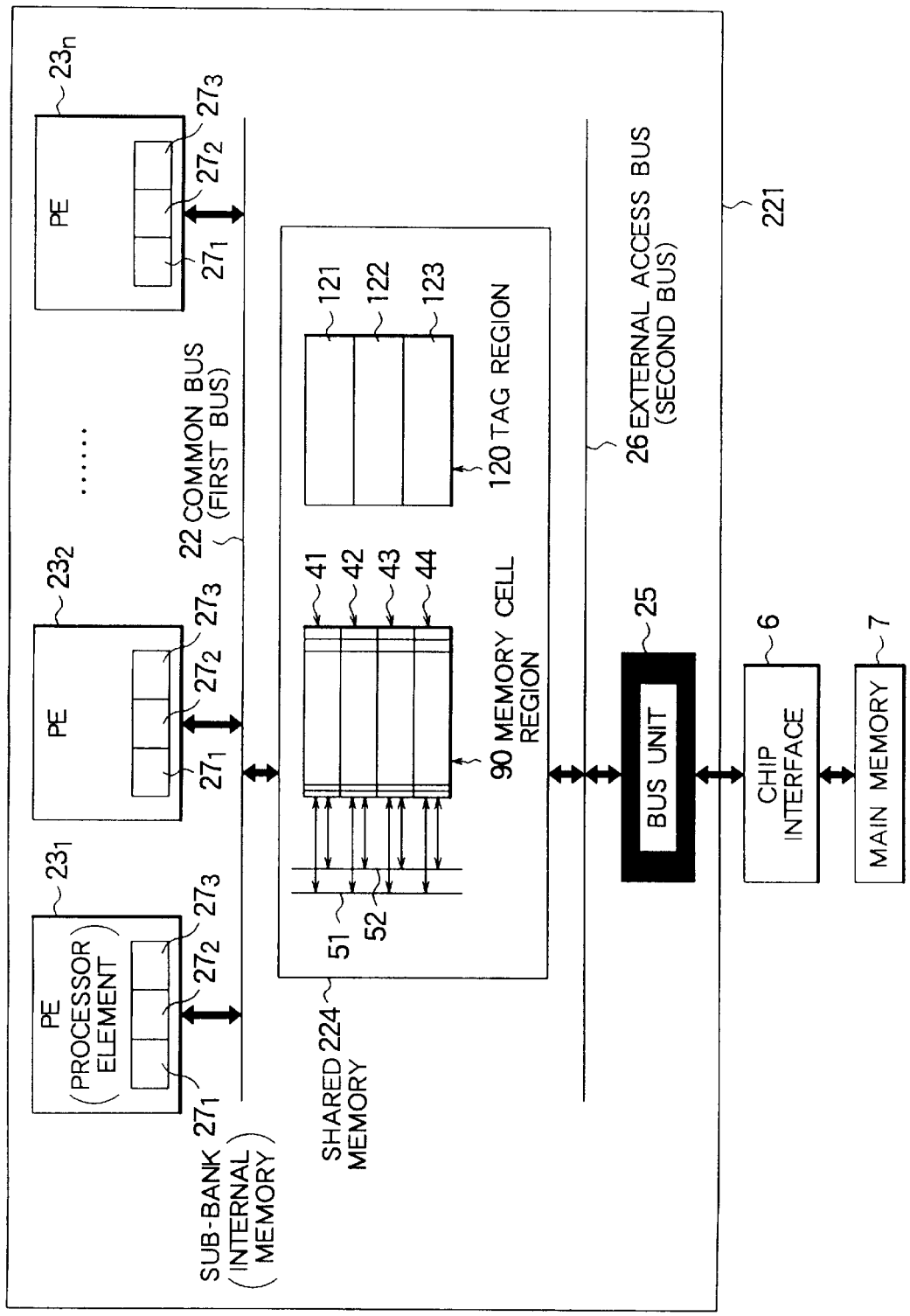
FIG. 6 is a view of the system configuration of the parallel processor according to a second embodiment of the present invention.

FIG. 6 is a view of the system configuration of the parallel processor 221 of the present embodiment.

As shown in FIG. 6, the parallel processor 221 comprises, for example, a common bus 22, processor elements $23_1$ to $23_n$, a shared memory 224, a bus unit 25, and an external access bus 26 as a second bus.

In the parallel processor 221, the processor elements $23_1$ to $23_n$ and the shared memory 224 are connected to the common bus 22. Also, the shared memory 224 and the bus unit 25 are connected to the external access bus 26.

Here, the common bus 22, the processor elements $23_1$ to $23_n$, the bus unit 25, and the external access bus 26 shown in FIG. 6 are the same as those explained In FIG. 1

Namely, the characteristic of the parallel processor 221 is in the shared memory 224.

Below, the shared memory 224 will be mainly explained.

Figure 7:
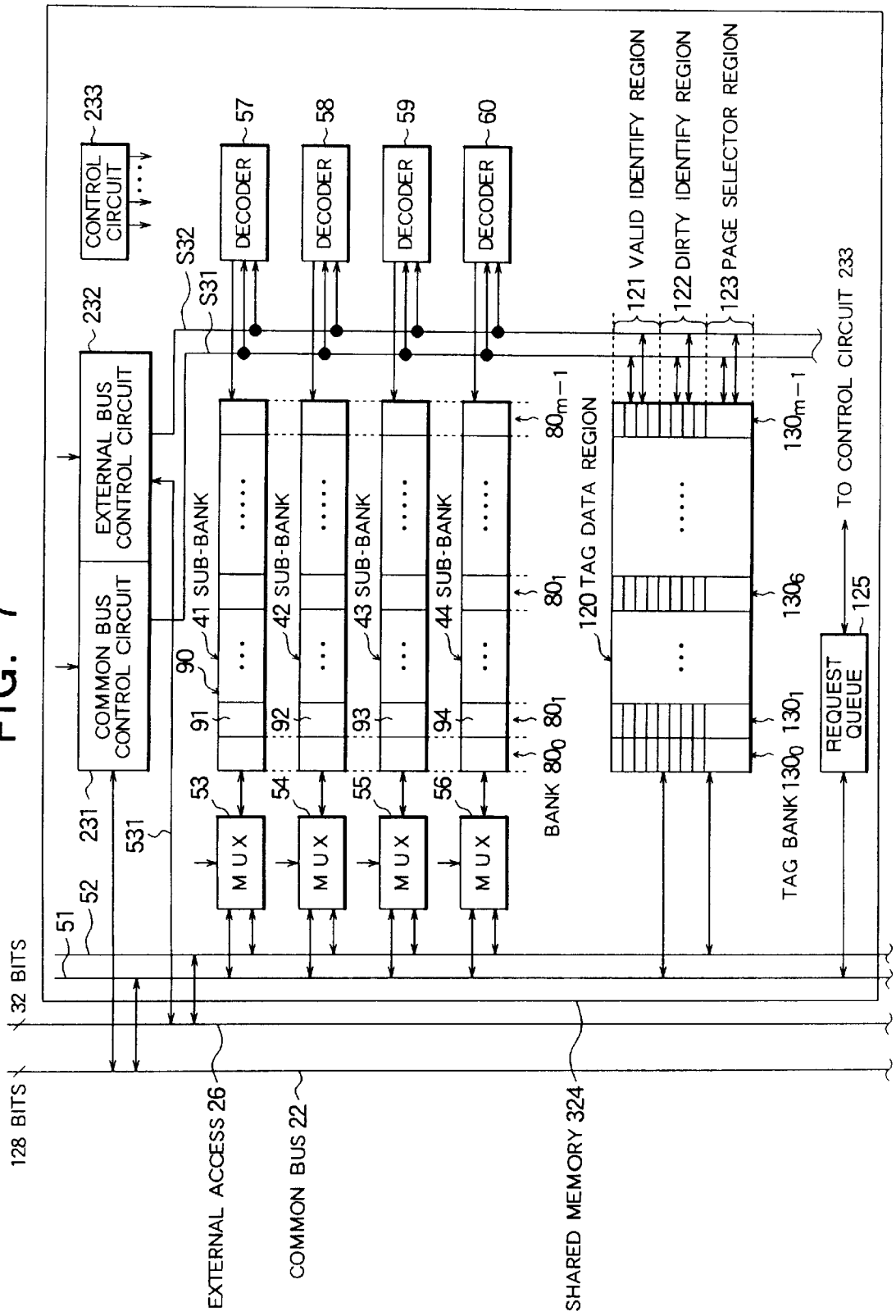
FIG. 7 is a view of the configuration of the shared memory shown in FIG. 6.

FIG. 7 is a view of the configuration of the shared memory 224 shown in FIG. 6.

As shown in FIG. 7, the common memory 224 comprises, for example, a common bus control circuit 231, an external bus control circuit 232, a control circuit 233, memory internal buses 51 and 52, multiplexers (MUX) 53, 54, 55, and 56, a memory cell region 90, address decoders 57, 58, 59, and 60, a tag data region 120, and a request queue 125.

Note that the common bus control circuit 231, the external control circuit 232, and the control circuit 233 function as a control means in the present embodiment.

Figure 8:
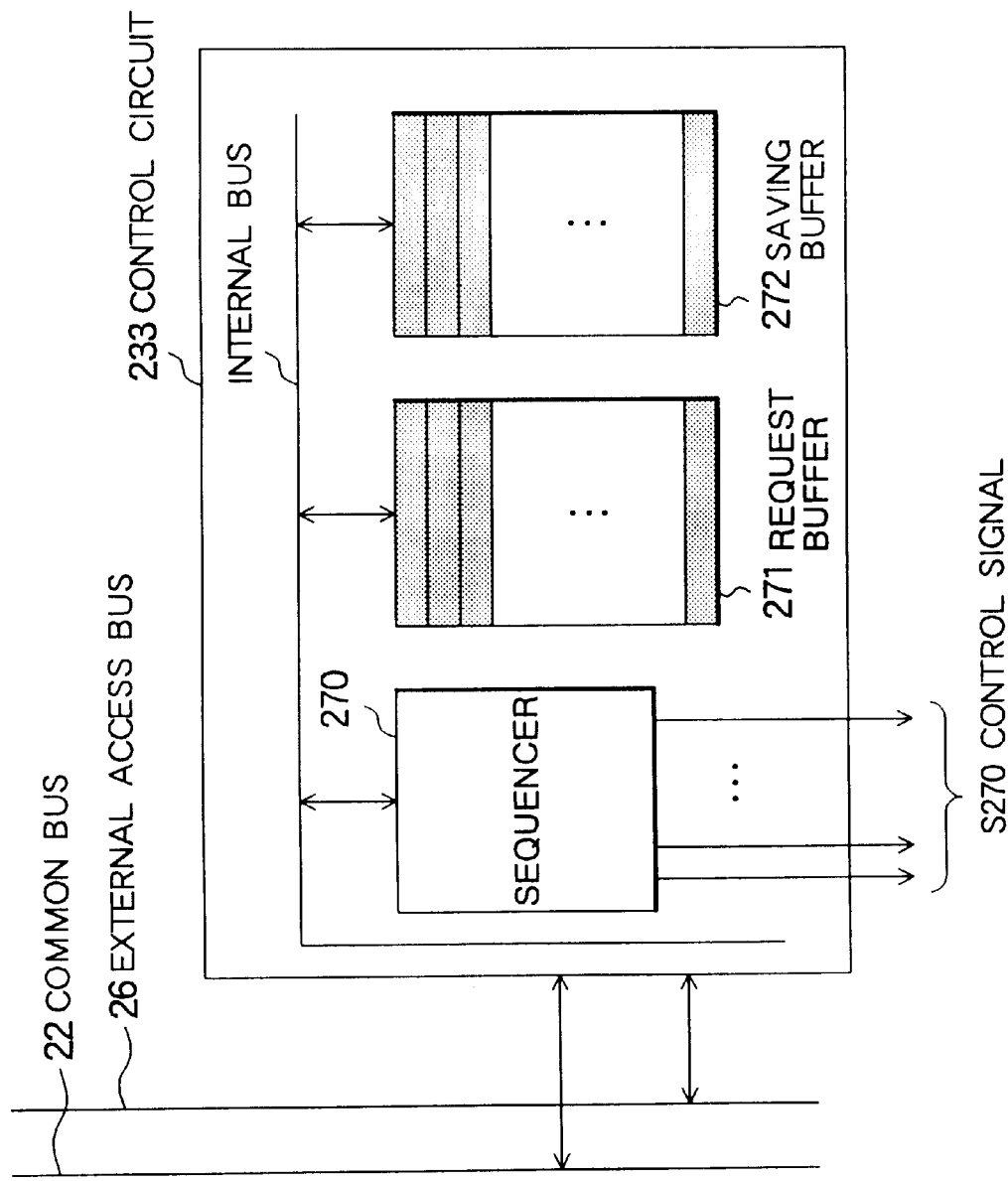
FIG. 8 is a view of the configuration of the control circuit shown in FIG. 7.

FIG. 8 is a view of the configuration of the control circuit 233.

As shown in FIG. 8, the control circuit 233 comprises a sequencer 270, a request buffer 271, and a saving buffer 272.

The sequencer 270 decodes the sub-page exchange request read from the request buffer 271, outputs a control signal S270 in accordance with the decoded result to the common bus control circuit 231, external bus control circuit 232, multiplexers 53 to 56, and the address decoders 57 to 60 and control the same.

Also, the sequencer 270 Judges whether or not the sub-page requested by the sub-page exchange request (i.e. an access request) is stored in the memory cell region 90 or not (i.e. whether a page hit exists or not) by referring to the tag data stored in the tag data region 120. When the sequencer 270 judges that a page fault has occurred, the sequencer 270 determines the page to be covered by the replacement with the page to be exchanged with the main memory 7 among a plurality of pages stored in the main memory cell region 90 by a method explained later.

Also, the sequencer 270 controls the page transfer between the shared memory 224 and the main memory 7 so as to transfer the sub-pages requested by the processor elements $23_1$ to $23_n$ first from the main memory 7 to the shared memory 224.

Also, the sequencer 270 is able to freely read from and write Into the request buffer 271 and the save buffer 272.

Below, an operation of the control circuit 233 when a plurality of sub-page exchange requests occurs continuously will be explained.

Figure 9:
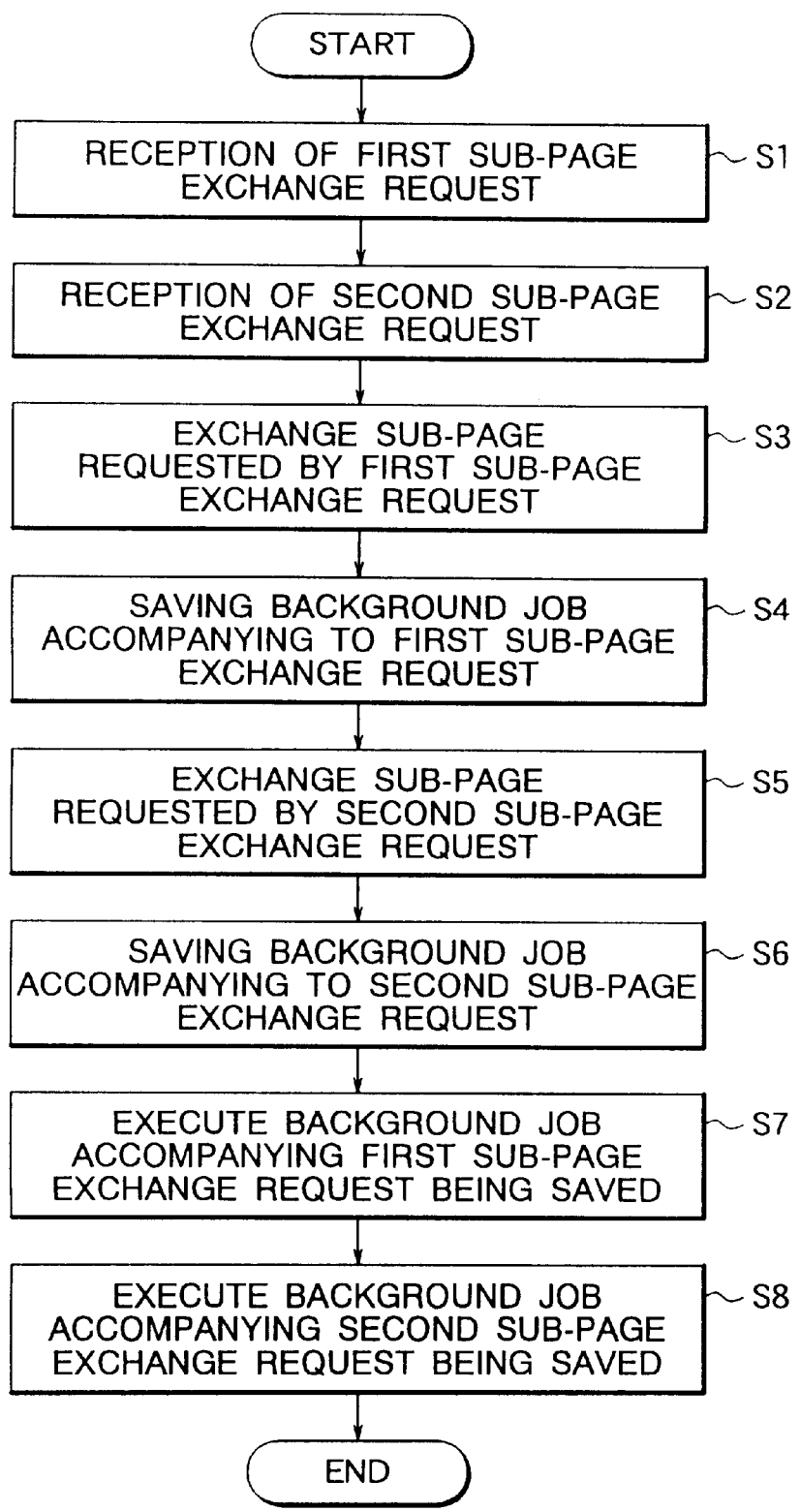
FIG. 9 is a flow chart of the processing of the control circuit when a plurality of sub-page exchange requests continuously occurs.

FIG. 9 is a flow chart of the processing of the control circuit 233 when a plurality of sub-page exchange requests occur continuously.

Step S1: The control circuit 233 receives as an input a first request for exchanging a sub-page, for example, from the processor element $23_1$ via the common bus 22 and stores the same in the request buffer 271.

Step S2: The control circuit 233 receives as an input a second request for exchanging a sub-page , for example, from the processor element 232 via the common bus 22, and stores the same in the request buffer 271.

Step S3: The sequencer 270 reads a first sub-page exchange request from the request buffer 271, decodes the same, and exchanges the sub-page requested by the first sub-page exchange request between the main memory 7 and the shared memory 224 via the external access bus 26 based on the control signal S270 in accordance with the decoded result.

Step S4: The sequencer 270 saves the background job accompanying the first sub-page exchange request, that is, the Job for exchanging a sub-page other than the requested sub-page between the main memory 7 and the shared memory 224 in the page to which the sub-page requested by the first request for exchanging the sub-page belong, in the saving buffer 272.

Step S5: The sequencer 270 reads the second sub-page exchange request from the request buffer 271, decodes the same, and exchanges a sub-page requested by the second sub-page exchange request between the main memory 7 and the shared memory 224 based on the control signal S270 in accordance with the decoded results.

Step S6: The sequencer 270 saves the background Job accompanying the second sub-page exchange request, that is, exchanges a sub-page other than the requested sub-page in the page to which the sub-page requested by the second request for exchanging a sub-page between the main memory 7 and the shared memory 224 belong, to the save buffer 272.

Step S7: The sequencer 270 reads and carries out the background Job accompanying the first sub-page exchange request saved at Step S4.

Step S8: The sequencer 270 reads and carries out the background Job accompanying the second sub-page exchange request saved at Step S6.

The request buffer 271 is, for example, a first-in first-out (FIFO) type memory for storing the sub-page exchange request from the processor elements $23_1$ to $23_n$ and capable of handling a plurality of sub-page exchange requests at a time.

The save buffer 272 is, for example, a FIFO type memory for storing the sub-page exchange request saved from the sequencer 270 in the explained Steps S4 and S5 shown in FIG. 9.

The common bus 231 controls the sub-page transfer between the processor elements $23_1$ to $23_n$ and the memory sub-banks 41 to 44 via the memory internal bus 51 and the common bus 22. Specifically, the common bus control circuit 231 outputs a control signal S31 to control the address decoders 57 to 60 based on the control signal from the control circuit 233 and controls switching of the multiplexers 53 to 56.

The external bus control circuit 232 controls the page transfer between the memory sub-banks 41 to 44 and the main memory 7 via the memory internal bus 52 and the external access bus 26. Specifically, the external bus control circuit 232 outputs the control signal S32 to control the address decoders 57 to 60 based on the control signal from the control circuit 33 and controls the switching of the multiplexers 53 to 54.

Here, the memory internal buses 51 and 52, the multiplexers (MUX) 53, 54, 55, and 56, the memory cell 90, the address decoders 57, 58, 59, and 60, the tag data region 120, and the request queue 125 are the same as those shown in FIG. 2.

Below, the operation of the parallel processor 221 will be explained.

Here, the operation of the parallel processor 21 in a case where a signal to request exchange of a sub-page 2(2) accompanied with a page miss is generated from the processor element $23_2$ shown in FIG. 6 before completing the exchange of the page P(1) between the shared memory 224 and the main memory 7 in accordance with the sub-page exchange request from the processor element $23_1$ shown in FIG. 6 will be explained with reference to FIG. 10.

Figure 10:
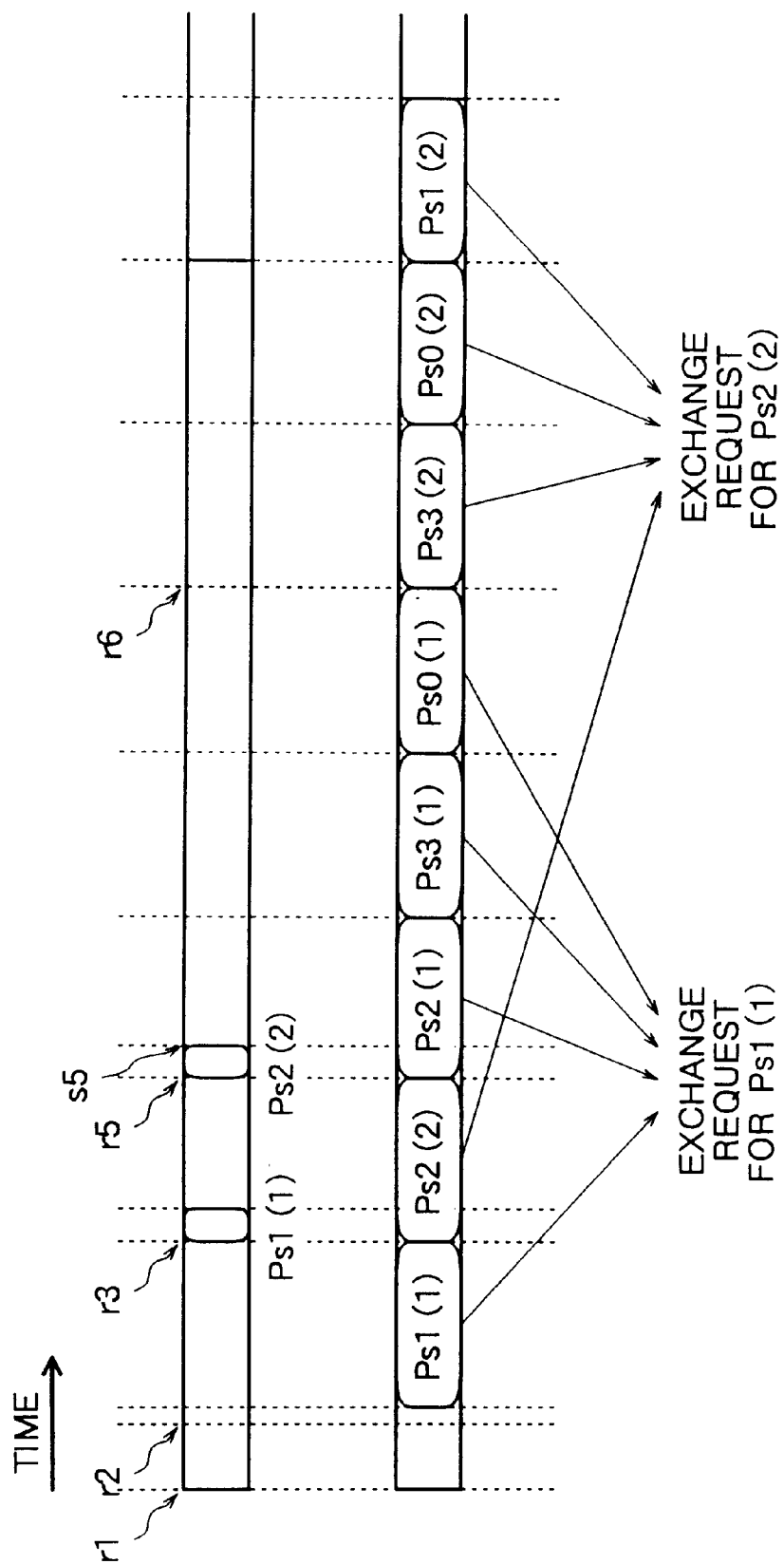
FIG. 10 is a timing chart for explaining the operation of the parallel processor shown in FIG. 6.

Specifically, as mentioned above, a case will be considered where an exchange request for sub-page Ps1(1) arises from the processor element $23_1$ shown in FIG. 1 at the timing of "r1" shown in FIG. 10, then an exchange request for sub-page Ps2(2) arises from the processor element $23_2$ shown in FIG. 1 at the timing of "r2".

In this case, an exchange request for sub-page Ps1(1) is output first from the processor element $23_1$ to the control circuit 233 of the shared memory 224 shown In FIG. 7 via the common bus 22 at the timing of "r1" shown In FIG. 10. The exchange request for sub-page Ps1(1) is stored in the request buffer 271 shown In FIG. 8. Then, an exchange request for sub-page Ps1(1) stored in the request buffer 271 Is decoded in the sequencer 270 and a control signal S270 in accordance with the decoded result is generated.

Subsequently, an exchange request for sub-page Ps2(2) is output from the processor element $23_2$ to the control circuit 233 of the shared memory 224 shown in FIG. 7 via the common bus 22 at the timing of "r2" shown in FIG. 10, and the request is stored In the request buffer 271 shown in FIG. 8. Then, the exchange request for the sub-page Ps2(2) stored in the request buffer 271 is decoded in the sequencer 270, and a control signal S270 in accordance with the decoded result Is generated.

Next, based on the control signal S270 in accordance with the result of decoding the exchange request for sub-page Ps1(1) in the sequencer 270, the sub-page Ps1(1) is exchanged between the main memory 7 and the sub-bank 42 of the shared memory 224 shown in FIG. 7 via the external access bus 26.

When the exchange is completed at the timing of "r3" shown in FIG. 10, the sub-page Ps1(1) is output from the sub-bank 42 to the processor element $23_1$ via the common bus 22.

Also, the background job accompanying the exchange request for sub-page Ps1(1) is saved in the save buffer 272 at the timing of "r3" shown in FIG. 10.

Also, based on the control signal S270 in accordance with the result of decoding the exchange request for sub-page Ps2(2) in the sequencer 270 at the timing of "r3" shown in FIG. 10, the sub-page Ps2(2) is exchanged, as shown in FIG. 10, between the main memory 7 and the sub-bank 43 of the shared memory 224 shown in FIG. 7.

After the completion of the exchange at the timing of "r5" shown in FIG. 10, the sub-page Ps2(2) is output from the sub-bank 43 to the processor element $23_2$ via the common bus 22.

Also, at the timing "r5" shown in FIG. 10, the background Job accompanying the exchange of sub-page Ps2(2) is saved in the saving buffer 272.

Furthermore, at the timing of "r5" shown in FIG. 10, the background Job accompanying the exchange request for the sub-page Ps1(1) saved in the saving buffer 272 is read and executed by the sequencer 270. Then, the sub-pages Ps2(1), Ps3(1), and Ps0(1) are exchanged between the main memory 7 and the sub-banks 43, 44, and 45 of the shared memory shown in FIG. 7 via the external access bus 26.

After the completion of the exchange at the timing of "r6" shown in FIG. 10, the background job accompanying the exchange request for the sub-page Ps2(2) saved in the saving buffer 272 is read and executed, and the sub-pages Ps3(2), Ps0(2), and Ps1(2) are exchanged between the main memory 7 and the sub-banks 44, 41, and 42 of the shared memory 224 via the external access bus 26.

As explained above, according to the parallel processor 221, when a plurality of sub-page exchange requests are continuously generated, the foreground jobs of the sub-pages requested by the exchange request for the sub-pages are executed prior to the background jobs thereof.

Accordingly, it is possible to shorten the time, for example, from the timing "r3", which is the end of the transfer of sub-page Ps1(1) from the main memory 7 to the shared memory 224, to the timing "r5", which is the end of the transfer of sub-page Ps2(2) from the main memory 7 to the shared memory 224 shown in FIG. 10, to 128 cycles.

Namely, according to the parallel processor 221, it is possible to shorten the time from the generation of a sub-page exchange request by the processor elements $23_1$ to $23_n$ to the reception of the requested sub-pages. Consequently, it is possible to shorten the waiting time of the processor elements $23_1$ to $23_n$ accompanying the memory access, so the processing performance of the parallel processor 221 can be improved.

According to the parallel processor 221, since the waiting time of the processor elements accompanying the memory access can be shortened in this way, the processor can be applied to the fields of embedding, NC machine tools, and so forth. Where real-time performance is required, in addition to general-purpose computers for calculation in the science and technology fields. It is also applied to audio/visual data processing (real-time broadcasting) which requires high real-time performance.

Especially, in a multiprocessor, the performance of a shared memory (through-put and latency of services) largely affects the system performance. Also, no economically effective methods have been used up to now and shared memories have been designed by costly methods.

For example, methods have been adopted such as increasing the memory capacity of the shared memory for storing to increase the probability of existence of a page in the shared memory. In such a method, however, the area occupied by the memory installed in an LSI increases, so there has been a disadvantage that a chip cannot be produced at a low cost. Also, there has been a problem in preparing a circuit, such as an operating frequency, accompanying the increase in area.

According to the parallel processor 221, the above disadvantages can be overcome.

In the image processing field, data in the same page is often continuously accessed by the processor elements $23_1$ to $23_n$. In the parallel processor 221, since three sub-pages having continuous addresses to the requested sub-page are read from the main memory 7 to the shared memory 224, the possibility of a page fault can be reduced. Namely, since there is a high possibility that the sub-pages having continuous addresses to the requested sub-page are accessed in the near future from the processor elements $23_1$ to $23_n$ due to the characteristics of image processing, reading these sub-pages together with the requested sub-page from the main memory 7 to the shared memory 224 is effective in reducing page faults in the future.

Also, in the parallel processor 221, it is possible to simultaneously perform the page exchange between the processor elements $23_1$ to $23_n$ and the shared memory 224 and the page exchange of the shared memory 224 and the main memory 7 by using a one-port structured memory cell for the shared memory 224. Therefore, high speed processing can be realized with a small circuit scale. Namely, the shared memory 224 can realize almost the same performance as a two-port structured memory in terms of functions in spite of its single port structure.

Third Embodiment

The parallel processor of the present embodiment is basically the same as the parallel processor 221 shown in FIGS. 6 and 7 of the above explained second embodiment except for the structure of the control circuit 233 shown in FIG. 7.

Figure 11:
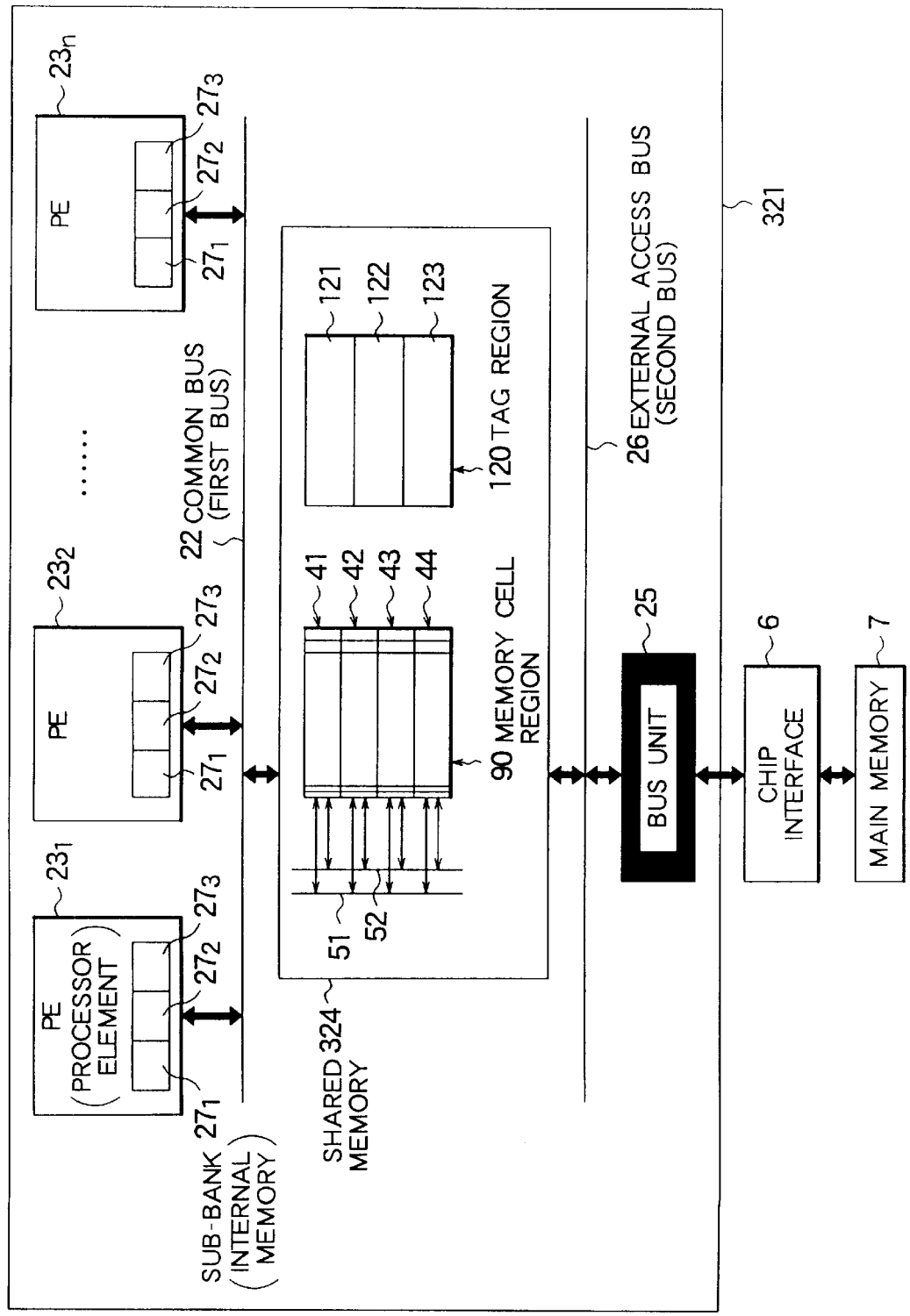
FIG. 11 is a view of the system configuration of the parallel processor according to a third embodiment of the present invention.

FIG. 11 is a view of the system configuration of the parallel processor 321 of the present embodiment.

As shown in FIG. 11, the parallel processor 321 is the same as the above parallel processor shown in FIG. 6 except for the shared memory 324.

Figure 12:
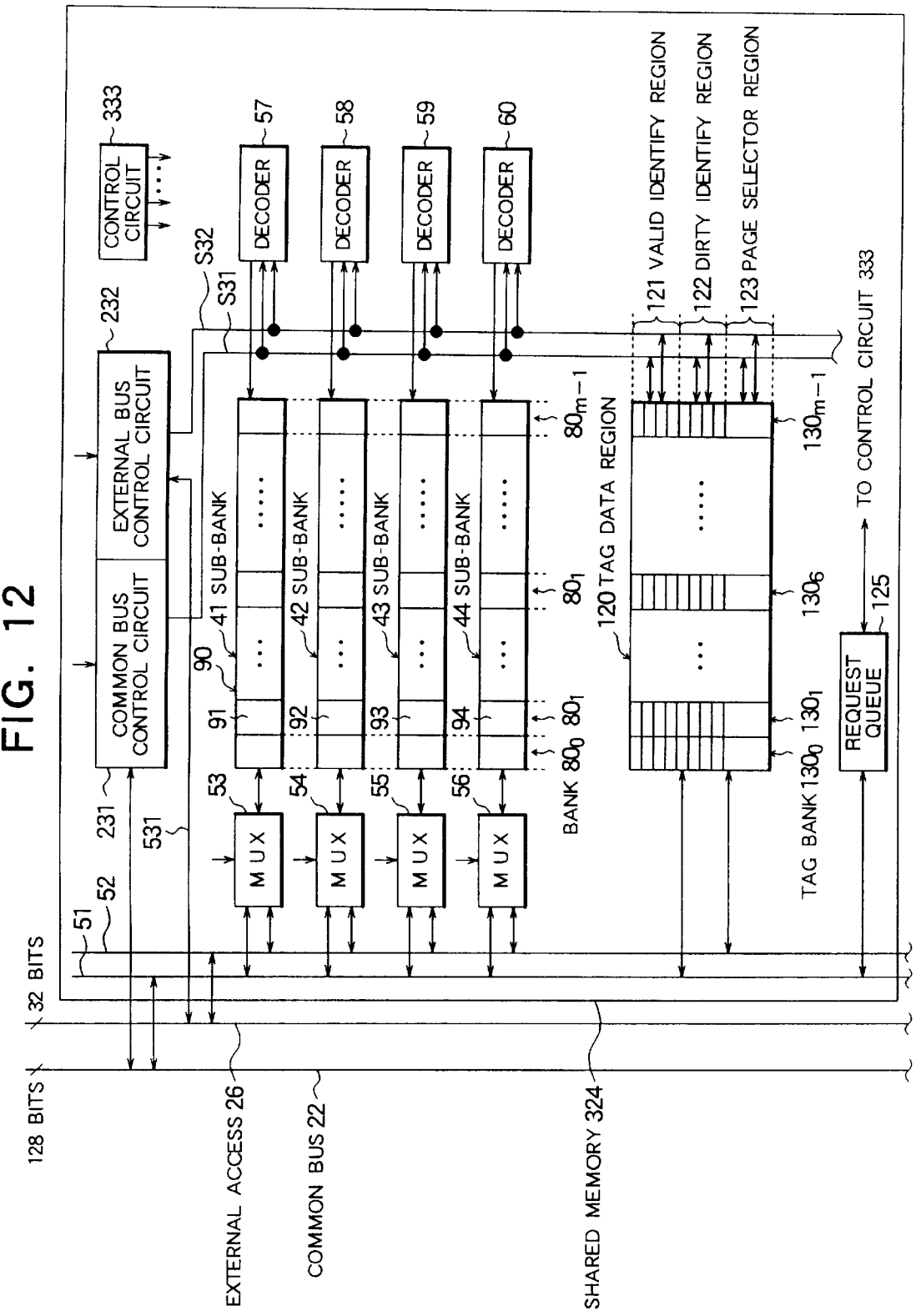
FIG. 12 is a view of the configuration of the shared memory shown in FIG. 11.

FIG. 12 is a view of the configuration of the shared memory 324 shown in FIG. 11.

As shown in FIG. 12, the shared memory 324 is the same as the above shared memory 224 shown in FIG. 7 except for the control circuit 333.

Figure 13:
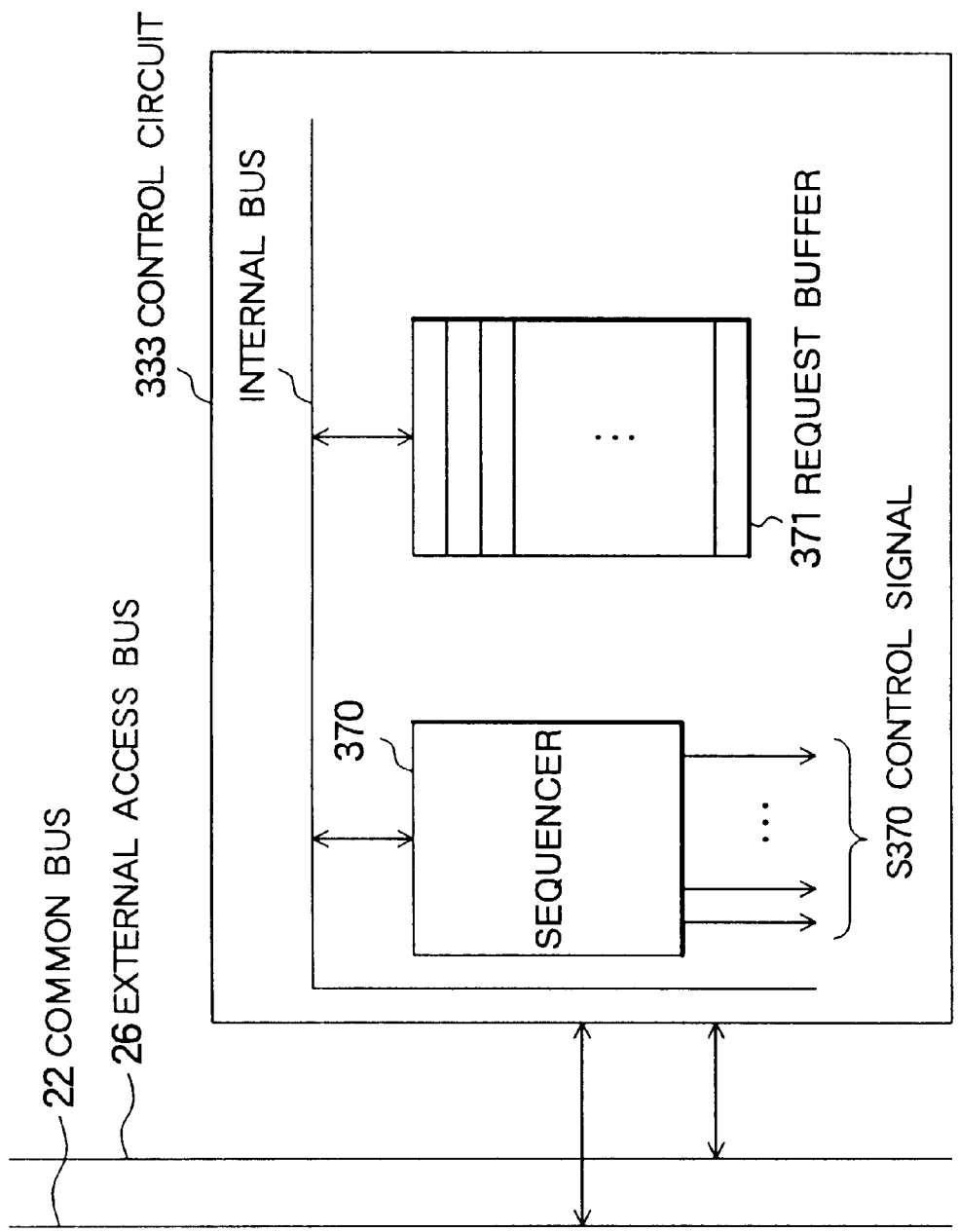
FIG. 13 is a view of the configuration of the control circuit shown in FIG. 12.

Below, an explanation will be made of the control circuit 333 shown in FIG. 13.

As shown in FIG. 12, the control circuit 333 comprises a sequencer 370 and a request buffer 371 and does not have a save buffer.

Figure 14:
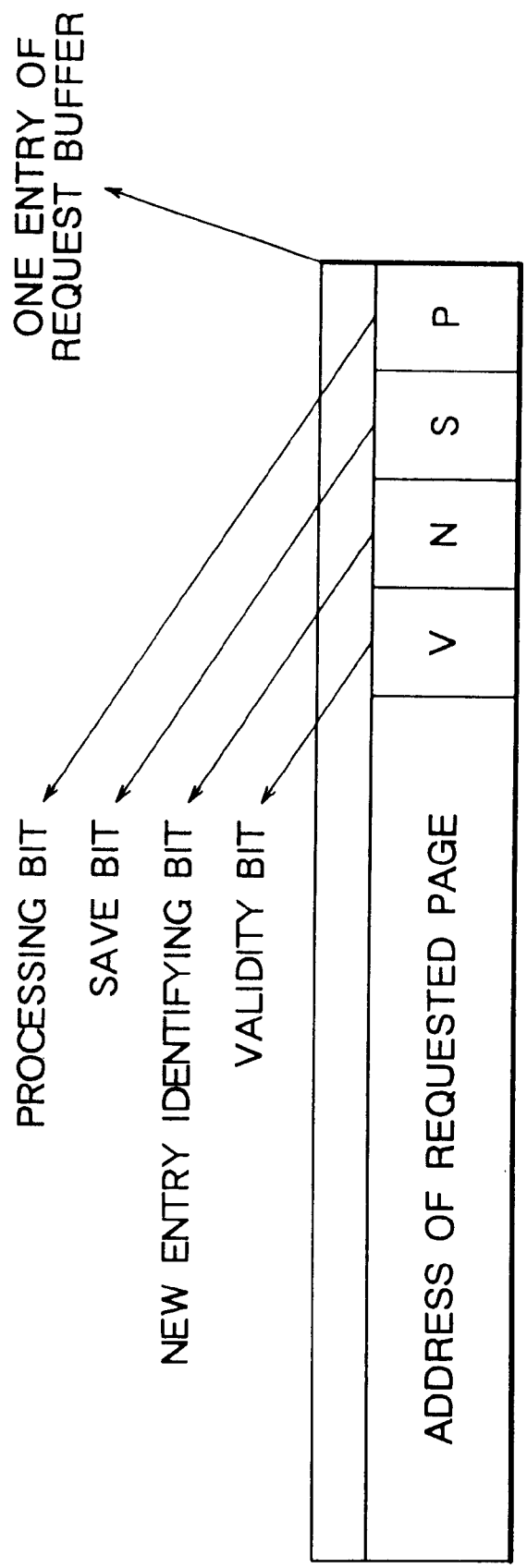
FIG. 14 is a view for explaining the configuration of each of entries of the request buffer shown in FIG. 13.
Figure 16:
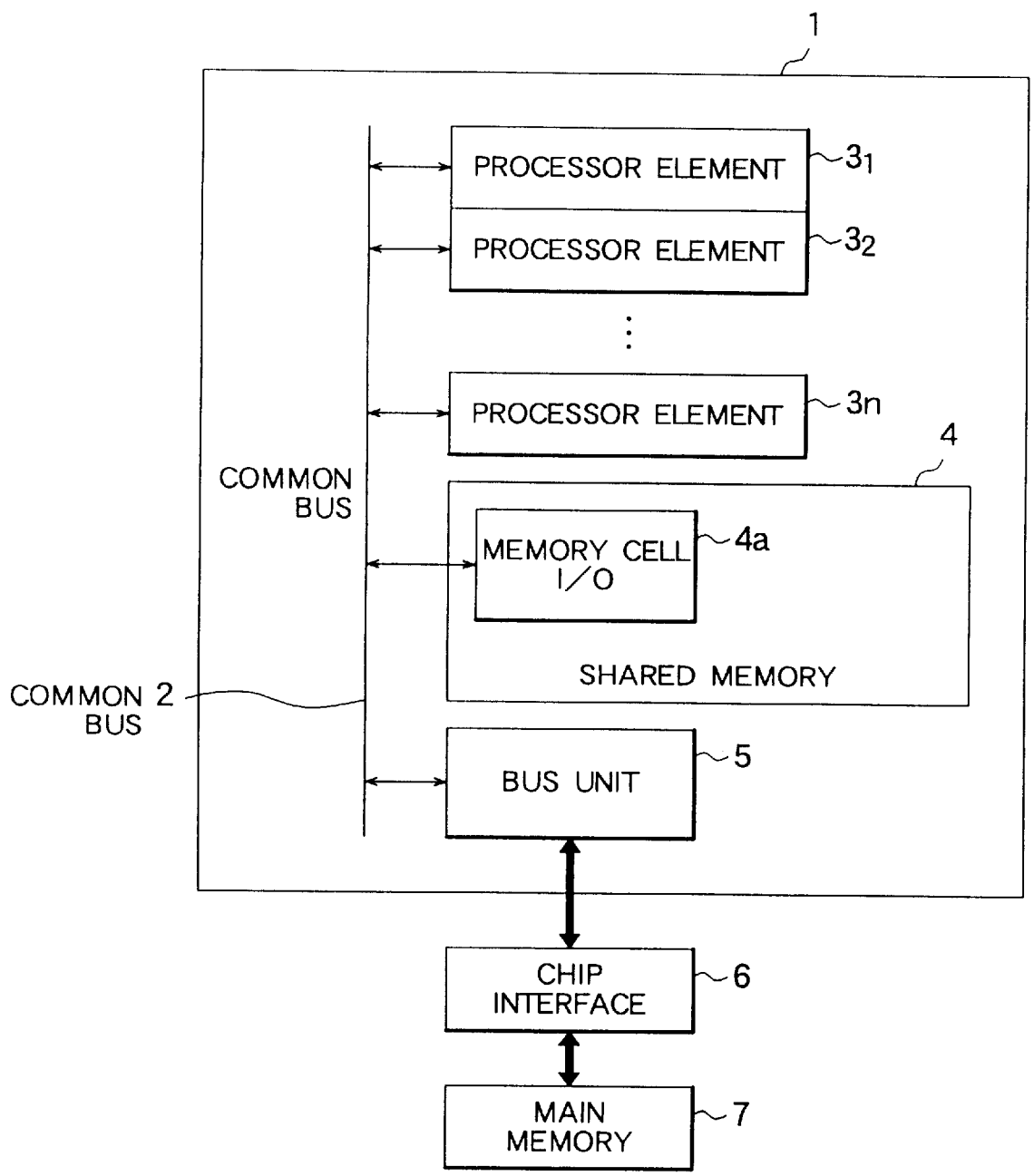
FIG. 16 is a view of the system configuration of a general parallel processor of the related art.

FIG. 14 is a view for explaining the configuration of the entries of the request buffer 371.

As shown in FIG. 14, each entry of the request buffer 371 has four Information bits including a validity bit "V", a new entry identifying bit "N", a save bit "S", and a processing bit "P" in addition to the address of the requested page "ADDRESS".

The validity bit "V" indicates whether or not the entry is valid.

The new entry identifying bit "N" indicates that the entry is new and that a page is not serviced to the processor element.

The save bit "S" indicates that the entry is saved.

The processing bit "P" indicates that a sub-page or a page is being exchanged via the common bus 22 or the external access bus 26.

These four information bits include five kinds of meanings shown in FIG. 15 by the combination of the bits. Below, "x" means one of "0" and "1".

As shown in FIG. 15, when "V, N, S, P" is "0, x, x, x", it means that no entry exists.

When the "V, N, S, P" is "1, 1, 0, 0", it means that the entry is a new entry before being processed.

When the "V, N, S, P" is "1, 1, 0, 1", it means the entry is a new entry and a page is currently being exchanged between the shared memory 324 and the main memory 7 via the external access bus 26.

When the "V, N, S, P" is "1, 0, 0, 1", it means that the entry is a new entry and a sub-page is currently being exchanged between the processor elements $23_1$ to $23_n$ and the shared memory 324 via the common bus 22.

Furthermore, when the "V, N, S, P" is "1, 1, 1, 0", it indicates that the entry is a new entry and that the entry was saved during a page exchange between the shared memory 324 and the main memory 7 via the external access bus 26.

Below, the operation of the parallel processor 321 will be explained by using the above case shown in FIG. 10.

Specifically, as explained above, a case will be explained where an exchange request for sub-page Ps1(1) is generated from the processor element $23_1$ shown in FIG. 1 at the timing of "r1" shown in FIG. 10, then an exchange request for sub-page Ps2(2) is generated from the processor element $23_2$ shown in FIG. 11 at the timing of "r2" shown in FIG. 10.

In this case, the exchange request for the sub-page Ps1(1) is output from the processor element $23_1$ to the control circuit 333 of the shared memory 324 shown in FIG. 12 via the common bus 22 at the timing of "r1" shown in FIG. 10. The exchange request is stored in the request buffer 371 shown in FIG. 13. Then, the exchange request for the sub-page Ps1(1) stored in the request buffer 370 is decoded and the control signal S370 (FIG. 13) in accordance with the decoded result is generated.

At this time, the entry of the exchange request for the sub-page Ps1(1) in the request buffer 371 has an "ADDRESS" which is an address of sub-page Ps1(1) in the request buffer, and the "V, N, S, P" is "1, 1, 0, 0".

Subsequently, an exchange request for sub-page Ps2(2) is output from the processor element 23₂ to the control circuit 333 of the shared memory 324 shown in FIG. 12 at the timing of "r2" shown in FIG. 10 via the common bus 22, and the exchange request is stored in the request buffer 371 shown in FIG. 13. Then, in the sequencer 370, the exchange request for sub-page Ps2(2) stored in the request buffer 371 is decoded and the control signal S370 in accordance with the decoded result is generated.

At this time, the entry of the exchange request for sub-page Ps2(2) in the request buffer 371 has the "ADDRESS" which is an address of the sub-page Ps2(2), and the "V, N, S, P" is "1, 1, 0, 0".

Then, based on the control signal S370 in accordance with the decoded result of the exchange request of the sub-page Ps1(1) in the sequencer 370, as shown in FIG. 10, the sub-page Ps1(1) is exchanged between the main memory 7 and the sub-bank 42 of the shared memory 324 shown in FIG. 1 via the external access bus 26. At this time, in the entry of the exchange request for the sub-page Ps1(1) in the request buffer 371, the "V, N, S, P" is "1, 1, 0, 1".

When the exchange is completed at the timing of "r3" shown in FIG. 10, sub-page Ps1(1) is output from the sub-bank 42 of the shared memory 324 to the processor element 23₁ via the common bus 22.

Also, in the entry of the exchange request for the sub-page Ps1(1) in the request buffer 371, the "V, N, S, P" are set to be "1, 1, 1, 0" at the timing of "r3" shown in FIG. 10. As a result, the background job of the exchange request for the sub-page Ps1(1) becomes saved.

At the timing of "r3" shown in FIG. 10, based on the control signal S370 in accordance with the decoded result of the exchange request of sub-page Ps2(2) in the sequencer 370, as shown In FIG. 10, sub-page Ps2(2) is exchanged between the main memory 7 and the sub-bank 43 of the shared memory 324 shown in FIG. 12 via the external access bus 26. At this time, in the entry of the exchange request for sub-page Ps2(2) in the request buffer 371, the "V, N, S, P" is "1, 1, 0, 1".

When the exchange is completed at the timing of "r5" shown in FIG. 10, sub-page Ps2(2) is output from the sub-bank 43 to the processor element 23₂ via the common bus 22.

At the timing of "r5" shown in FIG. 10, in the entry of the exchange request of sub-page Ps2(2) in the request buffer 371, the "V, N, S, P" is set to "1, 1, 1, 0". As a result, the background job of the exchange request of the sub-page Ps2(2) becomes saved.

Furthermore, at the timing of "r5" shown in FIG. 10, the background job accompanying the exchange request for sub-page Ps1(1) stored in the entry indicating a saving state (the "V, N, S, P" is "1, 1, 1, 0") in the request buffer 371 is read to the sequencer 270 and executed. Sub-pages Ps2(1), Ps3(1), and PS0(1) are exchanged between the main memory 7 and the sub-banks 43, 44, and 41 of the shared memory 324 shown in FIG. 11 via the external access bus 26.

When the exchange is completed at the timing of "r6" shown in FIG. 10, the background job accompanying the exchange request for the sub-page Ps2(2) stored in the entry indicating a saving state (the "V, N, S, P" is "1, 1, 1, 0") in the request buffer 371 is read and executed. The sub-pages Ps3(2), Ps0(2), and Ps1(2) are exchanged between the main memory 7 and the sub-banks 44, 41, and 42 of the shared memory shown in FIG. 11 via the external access bus 26.

As explained above, according to the parallel processor 321, when a plurality of sub-page exchange requests are continuously generated, in the same way as in the above parallel processor 221, the foreground jobs of the sub-page requested by the exchange of sub-page requests are executed prior to the background jobs thereof.

Accordingly, it is possible to shorten the time, for example, from the timing "r3", which is the end of transferring sub-page Ps1(1) from the main memory 7 to the shared memory 324, to the timing "r5", which is the end of transferring sub-page Ps2(2) from the main memory 7 to the shared memory 324 shown in FIG. 10, to 128 cycles.

The present invention is not limited to the above embodiments.

For example, in the second embodiment, as shown in FIG. 10, the execution of the background job of sub-page Ps1(1) is started from the timing "r5" when the transfer of sub-page Ps2(2) from the main memory 7 to the shared memory 324 was completed; however, the start of the background job is not specifically limited as far as it is at the timing of "r5" or later.

In the above third embodiment, a case of assigning one bit for the saving bit "S" shown in FIGS. 14 and 15 was given as an example. However, it is possible to properly deal with a case where another sub-page exchange request is generated during the execution of the background job by assigning two or more bits for the save bit "S" capable of specifying the sub-page first subjected to the background Job among three sub-pages other than the requested sub-page included in one page.

Also, in the above third embodiment, a case was described where a first sub-page exchange request and a second sub-page exchange request continuously arise, however, the present invention is able to deal with a case where three or more sub-page exchange requests continuously arise.

In this case, the foreground jobs of the continuously arising sub-page exchange requests are successively executed, then the background jobs thereof are successively executed.

In the above embodiments, a case was given where the memory cell region of the shared memories 24, 224, and 324 was divided into four memory sub-banks 41 to 44, however, it may be divided into any number of memory sub-banks. Accordingly, for example, the memory cell region of the shared memories 24, 224, and 324 may be divided into eight memory sub-banks. In this case, one page is composed by eight sub-pages.

Also, in the above embodiments, the data amount of a single sub-page was assumed to be 512 bytes, however, the data amount is not specifically limited and it may be 256 bytes or 1024 bytes.

In the above parallel processor, as shown in FIGS. 2, 7, and 11, a case of using a set of the memory internal bus 51 and the common bus 22 was given as an example; however, a plurality of sets of memory internal buses 51 and the common buses 22 may be provided as far as it Is less than the number of memory sub-banks. In this case, in accordance with the number of sets, the different sub-banks of the shared memories 24, 224, and 324 can be simultaneously accessed from the processor elements 23₁ to 23ₙ. Therefore, processing at a further higher speed can be realized.

Summarizing the effect of the invention, as explained above, according to the parallel processor of the present invention, the waiting time for the processor elements to access the shared memory can be shortened, so high processing performance can be realized.

Also, according to the processing method of the present invention, the waiting time for the processor elements to access the shared memory can be shortened, high processing performance can be realized.

While the invention has been described with reference to specific embodiment chosen for purpose of illustration, it should be apparent that numerous modifications could be made thereto by those skilled in the art without departing from the basic concept and scope of the invention.

What is claimed is:

1. A parallel processor comprising:
    a plurality of processor elements each having an inner memory storing one or more sub-pages and performing signal processing for the data stored in the inner memory;
    a first bus connected to said plurality of processor elements;
    a second bus connected to an outer memory; and
    a shared memory connected to said first bus and said second bus,
    said shared memory comprising:
        a storage means for storing a plurality of sub-pages and
        a control means for controlling, in accordance with an access request from a processor element, a transfer of a sub-page between the inner memory of the processor element and said storage means via said first bus and a transfer of a page comprising a plurality of sub-pages between said storage means and said outside memory via said second bus,
        said control means transferring sub-pages, by a first access request which in a request accompanied with a page fault from one processor element to the storage means and a second access request which is a request accompanied with a page fault from another processor element to said storage means from said outside memory to said storage means, and transferring another sub-page of the pages to which the sub-pages by the first access request and the second access request belong from the outside memory to the storage means,
        when, before the and of a page transfer between the shared memory and outside memory through the second bus due to the first access request, the second access request in generated.

2. A parallel processor as set forth in claim 1, wherein said control means transfers sub-pages by said first access request and said second access request through the second bus from the outside memory to the storage means, and transfers another sub-page of the page to which the sub-page by the first access request belongs through the second bus from the outside memory to the storage means, and transfers another sub-page of the page to which the sub-page by the second access request belongs through the second bus from the outside memory to the storage means.

3. A parallel processor as set forth in claim 2, wherein said control means transfers the sub-page by the first access request through the second bus from the outside memory to the storage means, and transfers the sub-page through the first bus from the storage means to the processor element generating the first access request.

4. A parallel processor as set forth in claim 3, wherein said control means transfers the sub-page by the second access request through the second bus from the outside memory to the storage means, and transfers the sub-page through the first bus from the storage means to the processor element generating the second access request.

5. A parallel processor as set forth in claim 4, wherein the transfer of the sub-page through the first bus and the transfer of the sub-page through the second bus are performed in parallel.

6. A parallel processor as set forth in claim 2, wherein said control means comprises:
    an access request storage unit for storing the first access request and the second access request,
    a save procedure storage unit for storing a procedure indicating processing for transferring another sub-page of the pages to which the sub-pages by the first access request and the second access request belong from the outside memory to the storage means, and
    a control unit for storing in the save procedure storage unit a first procedure for transferring another sub-page of the page to which the sub-page by the first access request belongs through the second bus from the outside memory to the storage means, storing in the save procedure storage unit a second procedure for transferring another sub-page of the page to which the sub-page by the second access request belongs through the second bus from the outside memory to the storage means, calling up and executes the first procedure from the save procedure storage unit, and calling up and executing the second procedure from the save procedure storage unit after execution of the first procedure.

7. A parallel processor as set forth in claim 2, wherein said control means comprises:
    an access request storage unit for storing the first access request and the second access request in correspondence with save data and
    a control unit for transferring the sub-page by the first access request through the second bus from the outside memory to the storage means; setting the save data corresponding to the first access request stored in the access request storage unit in a save state, transferring the sub-page requested by the second access request through the second bus from the outside memory to the storage means, setting the save data corresponding to the second access request stored in the access request storage unit in the save state, using the save data to read the first access request stored in the access request storage unit, transferring another sub-page of the page to which the sub-page requested by the first access request belongs through the second bus from the outside memory to the storage means, using the save data after the transfer to read the second access request stored in the access request storage unit, and transferring another sub-page of the page to which the sub-page by the second access request belongs through the second bus from the outside memory to the storage means.

8. A parallel processor as set forth in claim 1, wherein:
    said storage means comprises a plurality of sub-banks each storing one sub-page and
    said shared memory further comprises a plurality of selecting means provided corresponding to each of the plurality of sub-banks and connects a corresponding sub-bank and one of the selected first bus and second bus.

9. A parallel processor as set forth in claim 1, wherein the data transfer rate of the first bus is the same as the data transfer rate of the second bus or slower than the data transfer rate of the second bus.

10. A parallel processor as set forth in claim 8, wherein each sub-bank of the storage region of the storage means comprises a single data port.

11. A parallel processor as set forth in claim 8, wherein the plurality of sub-banks of the storage means have the same storage capacities.

12. A parallel processor as set forth in claim 8, wherein the number of the sub-banks of the storage means is the same as the number of sub-pages making up a page.

13. A parallel processor as set forth in claim 1, wherein the plurality of sub-pages making up a page have continuous addresses in the address space of the outside memory.

14. A processing method of a parallel processor having a plurality of processor elements comprising the steps of:

controlling, in accordance with an access request from a processor element, a transfer of a sub-page between said processor element and a shared memory via a first bus and a transfer of a page comprising a plurality of sub-pages between said shared memory and an outside memory via a second bus, transferring sub-pages by a first access request which in a request accompanied with a page fault from one processor element to the shared memory and a second access request which is a request accompanied with a page fault from another processor element to said shared memory from said outside memory to said shared memory, and transferring another sub-page of the pages to which the sub-pages by the first access and the second access belong from the outside memory to the shared memory, when before the and of a page transfer between the shared memory and outside memory through the second bus due to the first access request, the second access request is generated.

15. A processing method as set forth in claim 14, wherein the sub-pages are transferred by said first access request and said second access request through the second bus from the outside memory to the shared memory, another sub-page of the page to which the sub-page by the first access request belongs is transferred through the second bus from the outside memory to the shared memory, and another sub-page of the page to which the sub-page by the second access request belongs is transferred through the second bus from the outside memory to the shared memory.

16. A processing method as set forth in claim 15, wherein the sub-page is transferred by the first access request through the second bus from the outside memory to the shared memory, and the sub-page is transferred through the first bus from the shared memory to the processor element generating the first access request.

17. A processing method as set forth in claim 16, wherein the sub-page is transferred by the second access request through the second bus from the outside memory to the shared memory, and the sub-page is transferred through the first bus from the shared memory to the processor element generating the second access request.

18. A processing method as set forth in claim 17, wherein the transfer of the sub-page through the first bus and the transfer of the sub-page through the second bus are performed in parallel.

19. A parallel processor comprising:

plurality of processor elements each having an inner memory storing one or more sub-pages and performing processing using the data stored in said inner memory;

a first bus connected to said plurality of processor elements;

a second bus connected to an outer memory; and a shared memory connected to and said second bus, said shared memory comprises:

a storage means for storing a plurality of sub-pages and a control means for controlling, in accordance with an access request from a processor element, a transfer of a sub-page between the inner memory of the processor element and said storage means via said first bus and a transfer of a page comprising a plurality of sub-pages between said storage means and said outside memory via said second bus, transferring a sub-page from the outside memory to said storage means when there is an access request accompanied with a page fault from one processor element to the storage means, and transferring another sub-page of the page to which the sub-page requested by the access request belongs from the outside memory to the storage means.

20. A parallel processor as set forth in claim 19, wherein the control means transfers the sub-page by said access request through the second bus from the outside memory to the storage means, and transfers another sub-page of the page to which the sub-page by the access request belongs through the second bus from the outside memory to the storage means.

21. A parallel processor as set forth in claim 20, wherein said control means transfers the sub-page by the access request through the second bus from the outside memory to the storage means, and transfers the sub-page through the first bus from the storage means to the processor element generating the access request.

22. A parallel processor as set forth in claim 21, wherein the transfer of the sub-page through the first bus and the transfer of the sub-page through the second bus are performed in parallel.

23. A processing method of a parallel processor having a plurality of processor elements comprising the steps of:

controlling, in accordance with an access request from a processor element, a transfer of a sub-page between the process or element and a shared memory via a first bus and a transfer of a page comprising a plurality of sub-pages between said shared memory and an outside memory via a second bus, when an access request accompanied with a page fault is generated, from one processor element to the shared memory among the plurality of processor elements, transferring a sub-page requested by the access request from said outer memory to said shared memory, and transferring another sub-page of the page to which the sub-page by the access request belongs from the outer memory to the shared memory.

24. A processing method as set forth in claim 23, wherein a sub-page is transferred by said access request through the second bus from the outside memory to the shared memory, and another sub-page of the page to which the sub-page requested by the access request belongs is transferred through the second bus from the outside memory to the shared memory.

25. A processing method as set forth in claim 24, wherein the sub-page requested by the access request is transferred through the second bus from the outside memory to the shared memory, and the sub-page is transferred through the first bus from the shared memory to the processor element generating the access request.

26. A processing method as set forth in claim 25, wherein the transfer of the sub-page through the first bus and the transfer of the sub-page through the second bus are performed in parallel.

* * * * *

UNITED STATES PATENT AND TRADEMARK OFFICE
CERTIFICATE OF CORRECTION

PATENT NO.    : 6,349,370 B1                                        Page 1 of 1
DATED         : February 19, 2002
INVENTOR(S)   : Yoshihiko Imamura It is certified that error appears in the above-identified patent and that said Letters Patent is hereby corrected as shown below:

<u>Column 17,</u>
Line 44, replace "in" with -- is --.

<u>Column 19,</u>
Line 28, replace "and" with -- end --.

Signed and Sealed this

Fourteenth Day of January, 2003

JAMES E. ROGAN
*Director of the United States Patent and Trademark Office*